US012795753B2

(12) United States Patent
Reial et al.

(10) Patent No.: US 12,795,753 B2
(45) Date of Patent: Nov. 10, 2026

(54) CELL IDENTIFICATION INFORMATION

(71) Applicant: Telefonaktiebolaget LM Ericsson (publ), Stockholm (SE)

(72) Inventors: Andres Reial, Malmö (SE); Icaro L. J. Da Silva, Solna (SE); Asbjörn Grövlen, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 460 days.

(21) Appl. No.: 17/123,286

(22) Filed: Dec. 16, 2020

(65) Prior Publication Data

US 2021/0105839 A1 Apr. 8, 2021

Related U.S. Application Data

(63) Continuation of application No. 16/347,236, filed as application No. PCT/EP2017/078028 on Nov. 2, 2017, now Pat. No. 10,904,931.

(60) Provisional application No. 62/417,808, filed on Nov. 4, 2016.

(51) Int. Cl.

| | |
|---|---|
| ***H04W 76/11*** | (2018.01) |
| ***H04B 17/382*** | (2015.01) |
| ***H04W 16/28*** | (2009.01) |
| ***H04W 36/00*** | (2009.01) |

(52) U.S. Cl.
CPC .......... *H04W 76/11* (2018.02); *H04B 17/382* (2015.01); *H04W 16/28* (2013.01); *H04W 36/0061* (2013.01)

(58) Field of Classification Search
None
See application file for complete search history.

(56) References Cited

U.S. PATENT DOCUMENTS

| | | | | |
|---|---|---|---|---|
| 10,904,931 B2 * | 1/2021 | Reial | H04W 48/12 | |
| 2012/0207119 A1 * | 8/2012 | Zhang | H04L 5/0051 | 370/329 |
| 2013/0051364 A1 * | 2/2013 | Seol | H04W 16/28 | 370/329 |
| 2013/0155847 A1 | 6/2013 | Li et al. | | |
| 2014/0050188 A1 * | 2/2014 | Park | H04L 5/0094 | 370/329 |
| 2014/0120926 A1 | 5/2014 | Shin et al. | | |

(Continued)

FOREIGN PATENT DOCUMENTS

| | | |
|---|---|---|
| CN | 102273091 A | 12/2011 |
| CN | 103812546 A | 5/2014 |

(Continued)

OTHER PUBLICATIONS

3GPP TSG-RAN WG1 Meeting #87; Reno, NV; USA; Source: Ericsson; Title: Enabling beam grouping by UE in mobility RS measurements (R1-1611916)—Nov. 14-18, 2016.

(Continued)

*Primary Examiner* — Nguyen H Ngo
(74) *Attorney, Agent, or Firm* — Baker Botts L.L.P.

(57) ABSTRACT

A method in a network node for transmitting a cell identifier to identify a source for one or more beamed transmissions includes determining a cell identifier (CID) of the network node. The method also includes determining a beam identifier (BID) of a beam of the network node. The method further includes linking the CID and the BID and transmitting the BID and the CID to one or more user equipment (UE).

11 Claims, 20 Drawing Sheets

(56) References Cited

U.S. PATENT DOCUMENTS

| | | | |
|---|---|---|---|
| 2014/0177607 A1 | 6/2014 | Li | |
| 2014/0192768 A1 | 7/2014 | Yeh | |
| 2016/0073389 A1* | 3/2016 | Kishiyama | H04W 84/045 370/329 |
| 2016/0174244 A1 | 6/2016 | Kim et al. | |
| 2016/0353424 A1* | 12/2016 | Stirling-Gallacher | H04B 7/0626 |
| 2017/0019838 A1* | 1/2017 | Harada | H04L 25/0224 |
| 2017/0070937 A1 | 3/2017 | Li | |
| 2017/0195998 A1 | 7/2017 | Zhang | |
| 2017/0251444 A1 | 8/2017 | Huang | |
| 2017/0289917 A1 | 10/2017 | Visotsky | |
| 2017/0303173 A1 | 10/2017 | Cedergren | |
| 2018/0083680 A1 | 3/2018 | Guo | |
| 2018/0235013 A1 | 8/2018 | Jung | |
| 2019/0045377 A1 | 2/2019 | Kakishima et al. | |
| 2019/0200250 A1 | 6/2019 | Engstrom | |
| 2019/0215119 A1* | 7/2019 | Kim | H04L 5/0094 |
| 2020/0396721 A1* | 12/2020 | Tang | H04W 72/23 |

FOREIGN PATENT DOCUMENTS

| | | |
|---|---|---|
| CN | 103856894 A | 6/2014 |
| CN | 103875271 A | 6/2014 |
| CN | 103906139 A | 7/2014 |
| CN | 105122662 A | 12/2015 |
| CN | 105453629 A | 3/2016 |
| EP | 3 249 825 A1 | 11/2017 |
| JP | 2014 527367 A | 8/2012 |
| JP | 2014 532320 A1 | 12/2014 |
| JP | 2016 510197 A1 | 4/2016 |
| JP | 2017 532881 B2 | 11/2017 |
| WO | 2014 071852 A1 | 5/2014 |
| WO | 2016 044994 A1 | 3/2016 |
| WO | 2016 055102 A1 | 4/2016 |
| WO | 2016 115711 A1 | 7/2016 |
| WO | 2016 172840 A1 | 11/2016 |

OTHER PUBLICATIONS

3GPP TSG-RAN WG2 Meeting #95bis; Kaohsiung, Taiwan; Source: MediaTek Inc.; Title: Further Considerations on NR 'Cell' (R2-166103)—Oct. 10-14, 2016.

3GPP TSG-RAN WG2 #95bis; Kaohsiung, Taiwan; Source: Ericsson: Title: RRM measurements and mobility control in RRC Connected (R2-166923)—Oct. 10-14, 2016.

3GPP TSG-RAN WG2 Meeting #95bis; Kaohsiung, Taiwan; Source: Ericsson; Title: Identifiers for idle mode signals 'xSS' and connected mode signals 'RS' (R2-166925)—Oct. 10-14, 2016.

PCT International Search Report for International application No. PCT/EP2017/078028—Jan. 29, 2018.

PCT Written Opinion of the International Searching Authority for International application No. PCT/EP2017/078028—Jan. 29, 2018.

3GPP TSG RAN WG1 Meeting #86bis; Lisbon, Portugal; Source: OPPO; Title: Discussion on multi-beam based synchronization signal and DL broadcast channel for NR (R1-1608906)—Oct. 10-14, 2016.

3GPP TSG-RAN WG1 Meeting #86bis; Lisbon, Portugal; Source: Ericsson; Title: On NR DL mobility measurement signal design (R1-1609675)—Oct. 10-14, 2016.

Korean First Office Action—Notice of Preliminary Rejection issued for 519987015051—Aug. 11, 2020.

Japanese Notice of Reasons for Rejection issued for Patent Application No. 2019-523541—Jul. 21, 2020.

Chinese Search Report issued for Application No. 2017800823142—Dec. 25, 2020.

Official Action issued for Japanese Patent Application 2019-523541—Oct. 12, 2021.

Notice of Allowance issued by the National Intellectual Property Administration, P.R. China for Patent Application No. 201780082314.2—Oct. 20, 2021.

3GPP TSG RAN WG1 Meeting #87; Reno, NV, USA; Source: CATT: Title: NR RRM measurements and mobility management (R1-1611377)—Nov. 14-18, 2016.

Japanese Notice of Reasons for Rejection issued for Patent Application No. 2019-523541—Feb. 9, 2021.

Notice of Reasons for Rejection issued for Japanese Application No. 2021-182234—Dec. 22, 2022.

3GPP TSG RAN1 #86bis; Lisbon, Portugal; Agenda Item: 8.1.5.3; WF on DL measurement for L3 mobility, LG Electronics, Samsung, NTT DOCOMO (R1-1610828)—Oct. 10-14, 2016.

China Patent Office, Official Action and Search Report in CN Application No. 202210000828.1 dated Aug. 17, 2023 (not translated).

* cited by examiner

CELL IDENTIFICATION INFORMATION

PRIORITY

This application is a continuation, under 35 U.S.C. § 120 of U.S. patent application Ser. No. 16/347,236 which is a U.S. National Stage Filing under 35 U.S.C. § 371 of International Patent Application Serial No. PCT/EP2017/078028 filed Nov. 2, 2017 and entitled "Cell Identification Information" which claims priority to U.S. Provisional Patent Application No. 62/417,808 filed Nov. 4, 2016 both of which are hereby incorporated by reference in their entirety.

TECHNICAL FIELD

The present disclosure relates, in general, to wireless communications and, more particularly, to mobility reference signals.

BACKGROUND

In RAN1#86bis, it has been agreed that for L3 mobility based on downlink (DL) measurement in CONNECTED mode user equipment (UE), at least non-UE-specific DL signals can be used for CONNECTED mode radio resource management (RRM) measurement. Additionally, further study will be conducted on certain DL signals for CONNECTED mode RRM measurement: (1) Cell related reference signal (RS) which is carrying Cell-ID (e.g. new radio primary synchronization signal (NR-PSS), new radio secondary synchronization signal (NR-SSS)); (2) RS for mobility: association with beam-ID and/or Cell-ID; (3) RS for demodulating broadcast channel; and (4) A combination of (1) and (2). Other options are not precluded. Furthermore, further study will be conducted on certain RRM measurement quantities to be reported for L3 mobility: (1) derived per cell (e.g., if multi-beam, as a function of multi-beam measurements); (2) derived per beam; and (3) A combination of (1) and (2).

SUMMARY

Beam grouping indication utilizes the cell ID (CID) information that is already configured for local identification of cells. An example of such local identifier is the physical cell identifier (PCI) in LTE. MRS is transmitted, carrying the beam ID information. Associated with the BID, additional CID information is transmitted that can be detected when detecting the BID. It is understood that the CID information can be detected before, after, or simultaneous with detecting the BID. The UE can thus receive the MRS and detect the BID, extract association information from the BID to detect an associated CID, and finally detect the CID associated with the BID. Alternatively, the CID and BID parts may be detected separately and their association established.

Some examples of providing associated CID info are:

- Transmitting sequence-modulated CID info that is scrambled with a sequence derived from the BID
- Transmitting conventionally modulated symbols with CID info whose demodulation reference signal (DMRS) and modulation level and coding scheme (MCS) are derived from BID
- Transmitting a physical downlink channel (PDCH) container whose time/frequency (T/F) resources, DMRS and/or MCS are derived from BID

- Transmitting a dedicated control signaling message to the UE that provides the mapping between the BIDs and their corresponding CIDs.

In the preferred embodiment, the inclusion of CID info to accompany MRS transmission at the network (NW) and reception at the UE are configurable; in some deployments its transmission may be omitted.

In a particular embodiment, a method in a network node for transmitting a cell identifier to identify a source for one or more beamed transmissions includes determining a cell identifier (CID) of the network node. The method also includes determining a beam identifier (BID) of a beam of the network node. The method further includes linking the CID and the BID and transmitting the BID and the CID to one or more user equipment (UE).

In another embodiment, a method in a UE for receiving a cell identifier to identify a source for one or more beamed transmissions includes receiving a BID from a network node and receiving a CID linked to the BID.

In yet another embodiment, a network node for transmitting a cell identifier to identify a source for one or more beamed transmissions includes a memory and a processor. The processor is communicatively coupled to the memory and determines a cell identifier (CID) of the network node. The processor also determines a beam identifier (BID) of a beam of the network node and links the CID and the BID. The processor further transmits the BID and the CID to one or more user equipment (UE).

In another embodiment, a user equipment (UE) for receiving a cell identifier to identify a source for one or more beamed transmissions includes a memory and a processor. The processor is communicatively coupled to the memory. The processor receives a BID from a network node and receives a CID linked to the BID.

Certain embodiments of the present disclosure may provide one or more technical advantages. For example, in certain embodiments, the UEs can identify which MRS signals originate from the same cell based on an additional group ID (e.g. the cell ID) transmission that is unambiguously linked to the MRS. This is achieved without reducing the number of beams addressed by the MRS and without requiring frequent coordination of the group IDs. The feature enables more efficient handover measurements and procedures. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
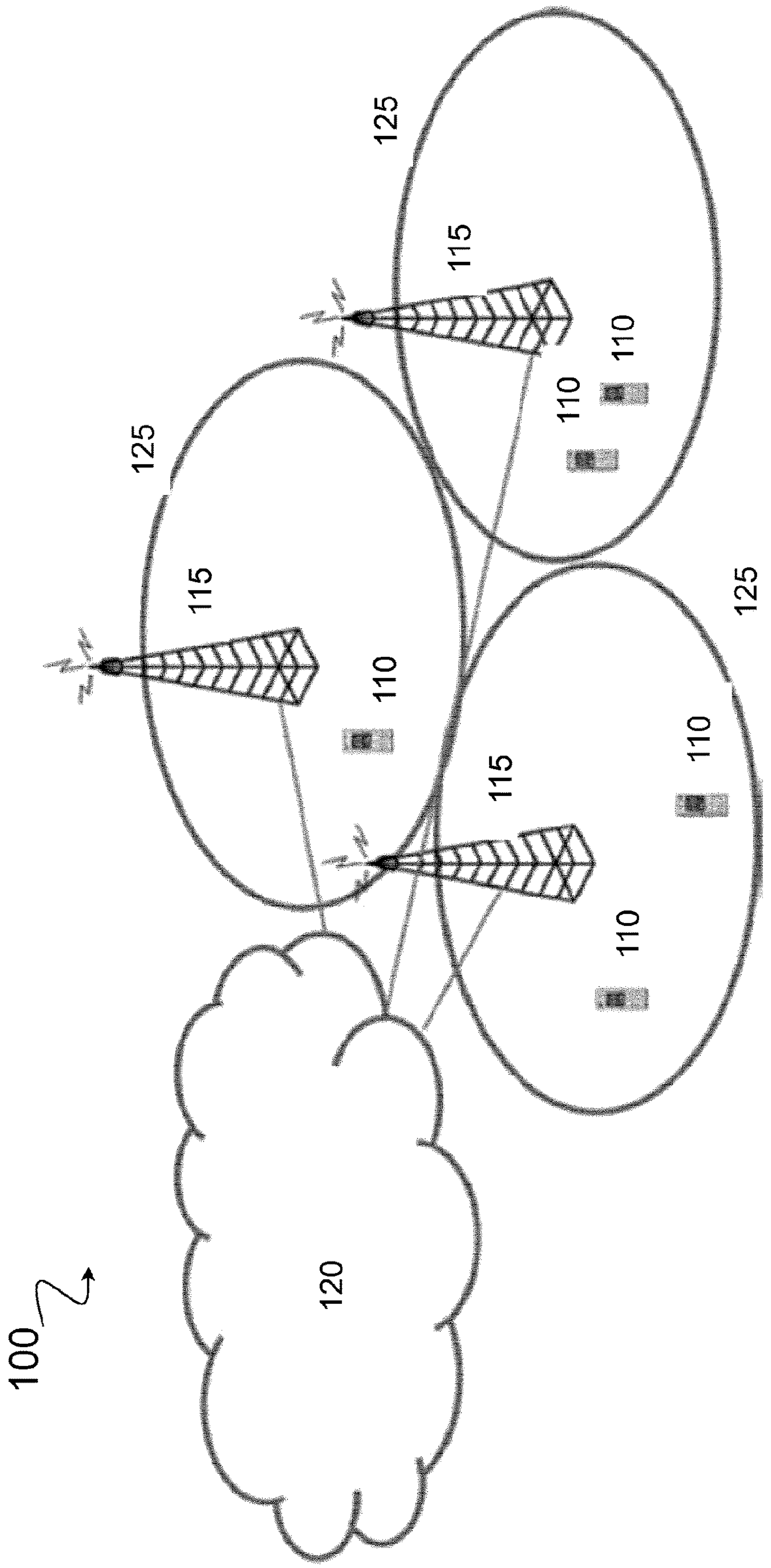
FIG. 1 is an illustration of an exemplary network, in accordance with certain embodiments.

There is a desire for active mode mobility signals that are self-contained and support synchronization, transmission reception point (TRP) identification, and signal quality measurement functions. A signal format for active mode mobility measurement signals is contemplated.

When the MRS transmissions from a set of neighboring cells are properly coordinated, the beam IDs carried by the individual MRSs are unique. The UE can report the measurements using the detected beam ID only and the network can associate the reported beams to their originating cells/TRPs. The UE can explicitly recognize the MRSs originating from its serving cell using prior RRC configuration info. However, in some cases it may be advantageous for the UE to also group MRSs from other, non-serving cells according to their origin.

This disclosure will first compare 4 options for DL signals for CONNECTED mode RRM measurement and discuss the motivation for providing the grouping information, although it is understood that these are not the only four options and that other options are possible.

Option 1: Cell Related RS which is Carrying Cell-ID (e.g. NR-PSS, NR-SSS)

In option 1, a candidate is the NR-PSS/NR-SSS that is envisioned to encode the NR Cell ID and provide support for Idle mode operation such as RRM measurement for cell selection and cell reselection, synchronization for decoding system information, DL synchronization reference for physical random access channel (PRACH) resources, etc. The main benefit of using that signal is that this would avoid the definition of a new RS for mobility. However, the problem of using the NR-PSS/NR-SSS is that one would either be forced to transmit them with very narrow beamforming and create the overhead of transmitting physical broadcast channel (PBCH) for every narrow single beam (so that the UE is able to detect them while it also decodes beamformed data channels) or measurement gaps should be configured, which represents additional overhead and reduced data rates. In addition, one would be forced to adjust the periodicity of idle mode operation to fulfil active mode mobility requirements. This might require signals to be transmitted more often. The same concerns apply for any other cell-specific reference signals.

Another problem of option 1 is the fact that it might be challenging to the UE to distinguish beams from a given Transmission-Receive Point (TRP) assuming there could be few wide beams transmitting the same NR-PSS/NR-SSS (and/or another cell specific RS). For L3 mobility, this ability to distinguish beams may be necessary to perform RRM measurements per beam e.g. in the case one shot measurements are not supported and the UE averages multiple occasions of the same beam which could be more challenging in option 1. Another reason is that the UE should report RRM measurements of neighbor cells to the serving cell and, in that case, reporting that a given cell is better than the serving cell simply hides beam information from the serving cell. In analog and/or hybrid beamforming, the base station receiver may use Rx beamforming for PRACH and that would be associated to a given beam and/or group of beams from the same TRP. In that case, not informing which beams and/or which PRACH resource to access may lead to either the UE not accessing the PRACH resource associated to the beam the UE is trying to access (e.g., creating UL interference and/or not having proper PRACH coverage) or the UE should read PBCH from a neighbor beam every time a handover is executed, which is not the case today in LTE.

Option 2: RS for Mobility

In option 2, a new RS used for mobility would enable the network to have the flexibility to transmit that signal to fulfil specific requirements to mobility in RRC CONNECTED. Defining a new signal or a new set of signals would enable the network to transmit these mobility reference signals (MRSs) with different beamforming configuration as defined for idle mode operation e.g. MRS transmission in narrow beams (to avoid the need to create measurement gaps when NR-PSS/NR-SSS are transmitted in wide beams, and/or omnidirectional and/or in single frequency networks (SFN)) while the NR-PSS/NR-SSS/PBCH could be transmitted in wide beams (to reduce the overhead of system information transmission). In addition to the possibility to configure beamforming differently, a new signal (e.g., a purpose-built package of existing signals) would also enable the usage of different periodicities, important to enable long discontinuous transmission (DTX) cycles for energy efficiency, especially important in Idle mode.

An open question related to option 2 was whether to associate this mobility RS with a beam-ID and/or Cell-ID. The mobility RS should carry at least a beam ID to support L3 mobility to mitigate the challenges inherent from option 1. However, to achieve the flexibility of configuring the MRSs to fulfil requirements of active mode mobility e.g. having different beamforming properties than NR-PSS/NR-SSS designed for idle mode operation, and, at the same time, achieve some benefits of associating the mobility RSs to the NR-Cell used for idle mode operation, different solutions should be studied such as:

Option a) Define a group of beams by the range of MRS identifiers. The association between identifiers and the cell ID can then be done;

Option b) Define a group of beams by the frequency resources they are transmitted. The association between the frequency resources the MRSs are transmitted and the cell ID can also be done via system information;

Option c) Encode the cell ID used for idle mode and the beam ID in the mobility RS: consider how these are then encoded e.g. using a single modulation sequence.

Option 3: RS for Demodulation of Broadcasting Channel

Assuming the usage of Rx analog beamforming for PRACH detection, there is the possibility to have beam-specific PBCH so that the UE could simply use these reference signals to decode PBCH to also measure the quality of each beam and fulfil the requirements discussed above for Option 2. In that case the UE would be able to group these beams using the NR-PSS/NR-SSS. However, it is unclear whether at the end these PBCH RSs should be beam-specific RSs to avoid the interference across beams transmitting different PBCH content.

Option 4: Combination of Options 1 and 2

Considering the benefits of option 2 and some of the advantages of option 1, especially in the case where there is no need to transmit these RSs for RRM measurements in narrow beams (e.g. in lower frequencies and/or when the UEs are not always transmitting with very high data rates and measurements gaps do not need to be configured or are not a problem), the network may have the flexibly to either configure the UE to measure on the NR-PSS/NR-SSS (even including RSs used for PBCH) and/or newly design mobility RSs which could encode some notion of group of beams that can be associated with the cell ID used in idle.

Supporting both IDLE cell signals and ACTIVE mobility RS with an optional possibility to identify the originating cell for ACTIVE mode mobility allows a range of network solutions to match particular deployment conditions and operator preferences.

MRS Design

Active mode mobility signals have been discussed that are self-contained and support synchronization, TRP identification, and signal quality measurement functions. When the MRS transmissions from a set of neighboring cells are properly coordinated, the beam IDs carried by the individual MRSs are unique. The UE can report the measurements using the detected beam TD only and the network can associate the reported beams to their originating cells/TRPs. The UE can explicitly recognize the MRSs originating from its serving cell using prior RRC configuration info.

Motivation for Beam Grouping

Downlink based active mode mobility is based on comparing measurements on an MRS belonging to a serving node with other MRSs. The UE should know which MRSs belong to the serving node and this is denoted the “serving MRS set.” For the purpose of reporting if an “away MRS” (an MRS not in the serving MRS set) is better than an MRS in the serving MRS set, the UE does not need to know which node the away MRS belongs to.

However, the UE may also desire to also group MRSs from other, non-serving cells according to their origin.

In case the UE knows that two MRSs belong to the same node, then it may, for example, start the time to trigger (TTT) for the MRS measurement reporting when the first away MRS triggering conditioning occurs. If the UE then notices that the second away MRS becomes better, it can keep the TTT running.

Another thing the UE can do in case it knows that two or more away MRSs belong to the same node is to combine the two measurements into a composite measurement that may better reflect the quality the UE can expect after a handover.

To allow the UE to recognize that several MRSs originate from the same non-serving cell, the MRS transmissions should include some indicator that is common to beam groups from the same cell, but different for groups from different cells.

In some solutions, the beam ID (BID) field conveyed by the MRS via the configured time, frequency, and sequence resources may be used to include a group ID that is common to beams originating from the same cell. For example, if the BID field spans 10 bits, 4 bits could be used to identify the group (e.g. cell) and the remaining 6 bits to identify the beam within the group.

However, this approach has severe drawbacks. The allocation of e.g. 4 bits to the group ID reduces the number of bits left to identify individual beams within the cell. Perhaps more importantly, the allocation of the group IDs should be coordinated in a given neighborhood of cells to avoid group ID conflicts. This may impose a considerable overhead in terms of inter-cell or inter-TRP negotiation and signaling.

There is thus a desire for a method for indicating beam groups that do no reduce the number of beams specified per cell and/or do not require frequent coordination between the cells.

This disclosure relates to the inclusion of Cell ID information in mobility reference signals (MRS). In telecommunications networks, a network node may transmit signals to and receive signals from a user equipment (UE) (e.g., a mobile phone, tablet, etc.). The area over which the network node transmits and receives signals is referred to as a “cell.” The network node may also transmit and receive signals in the cell by forming beams over which the signals are communicated. The beams may cover only a portion of the cell and may be directed towards a particular location in the cell (e.g. a location of the UE). By forming a beam towards the UE, the signal quality to and from the UE may be improved and/or enhanced. For example, the directed beam may allow the UE to receive signals that may otherwise be disrupted by interference and/or signal degradation.

The network node may communicate identifiers for both the cell and the beam. A cell identifier (CID) identifies the network node or the cell covered by that network node. A beam identifier (BID) identifies a particular beam of the network node. In conventional telecommunications networks, the CID and BID(s) of a network node are not linked to one another. In other words, a UE cannot determine the cell in which a particular beam is transmitted solely from the received BID of the beam. Conversely, the UE cannot determine the beams in a particular cell solely from the received CTD of the cell. As a result, when a UE is located such that it receives multiple beams from different cells, it may become difficult for the UE to determine whether to tune its radio to a particular beam. For example, it may be undesirable for a UE to tune to a particular beam if that tuning would result in the UE performing a handover to connect to a different cell and/or network node. But because the UE cannot determine the cell that is linked to a particular beam, it is difficult for the UE to determine whether to tune to that beam.

This disclosure contemplates a network in which a BID is linked to a CID. In certain embodiments, by linking the BID and CID, a UE can identify a cell in which a beam is formed using the BID of the beam. As a result, the UE can perform features that were previously not possible, such as for example, prioritizing beams from a particular cell or network node over beams from another cell or network node. Additionally, the UE can group beams by their cell or network node. The network and its functions will be described using FIGS. 1-11.

FIG. 1 is an illustration of an exemplary network, in accordance with certain embodiments. Network 100 includes one or more UE(s) 110 (which may be interchangeably referred to as wireless devices 110) and one or more network node(s) 115 (which may be interchangeably referred to as enhanced node Bs (eNBs), or 5G network nodes (gNBs) 115). This disclosure contemplates network 100 being any suitable network. For example, network 100 may be a 2G, 3G, 4G, LTE, or 5G (also referred to as New Radio (NR)) network or a combination of any of these types of networks. In a 5G implementation, network 100 may include one or more 5G network nodes (gNBs) 115 that serve as transmission reception points (TRPs) that transmit and receive wireless signals with other components of network 100 (e.g., one or more user equipment (UE) 110). Although certain terms used herein are generally understood to be used in Long-Term Evolution (LTE) networks, these terms are merely examples and shall not be understood to limit this disclosure to a particular network. Other radio systems such as 3GPP New Radio (NR) are contemplated for implementing any of the features described herein.

UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodcB" could be considered as device 1 and "UE" device 2, and these two devices communicate with each other over some radio channel.

MRS Design Criteria

The MRS should be dynamically configurable (which beams, how often, shape, etc.), self-contained (MRS-related info in same beam, activated/deactivated together) and not relying on multiple signals with different coverage properties. It should allow synchronization, beam detection, quality measurements and provide an address space of hundreds of unique beams. The BIDs should be locally unique (inter-TRP/cell coordinated) so that when UE reports a received beam ID, the NW knows which TRP/cell it corresponds to. The per-beam duration should be kept short to allow fast beam sweep/scan.

For the purpose of providing a concrete example, this disclosures considers a baseline MRS configuration that provides an effective beam ID (BID) address space provided by the MRS is thus approximately 10 bits, transmitting in 95 REs. A reasonable assumption is that the local CID (corresponding to the PCI in LTE) should accommodate 10 bits.

The MRS design can be contained in a subband consisting of less than 100 REs. The additional CID info according to option 1 would occupy 60+ REs. The original 100-RE allocation may be considered a relatively limited one for AMM measurements and there have been suggestions that, in some scenarios, a wider MRS allocation could improve measurement robustness. Instead of using the additional BW, or the additional REs, to provide redundant BID information, they can be used to provide CID information.

Inclusion of Group ID in MRS

For the UE to be able to recognize that certain candidate beam MRSs come from the same (non-serving) cell, (e.g. MRS-4 and -5 coming from NR cell 2 in the Figure) relevant group identifier (GID) should be associated with the MRS transmission. To enable non-serving cell MRS grouping, cell identifier (CID) info may be a good choice as a GID to be associated with the MRS transmissions.

Figure 2:
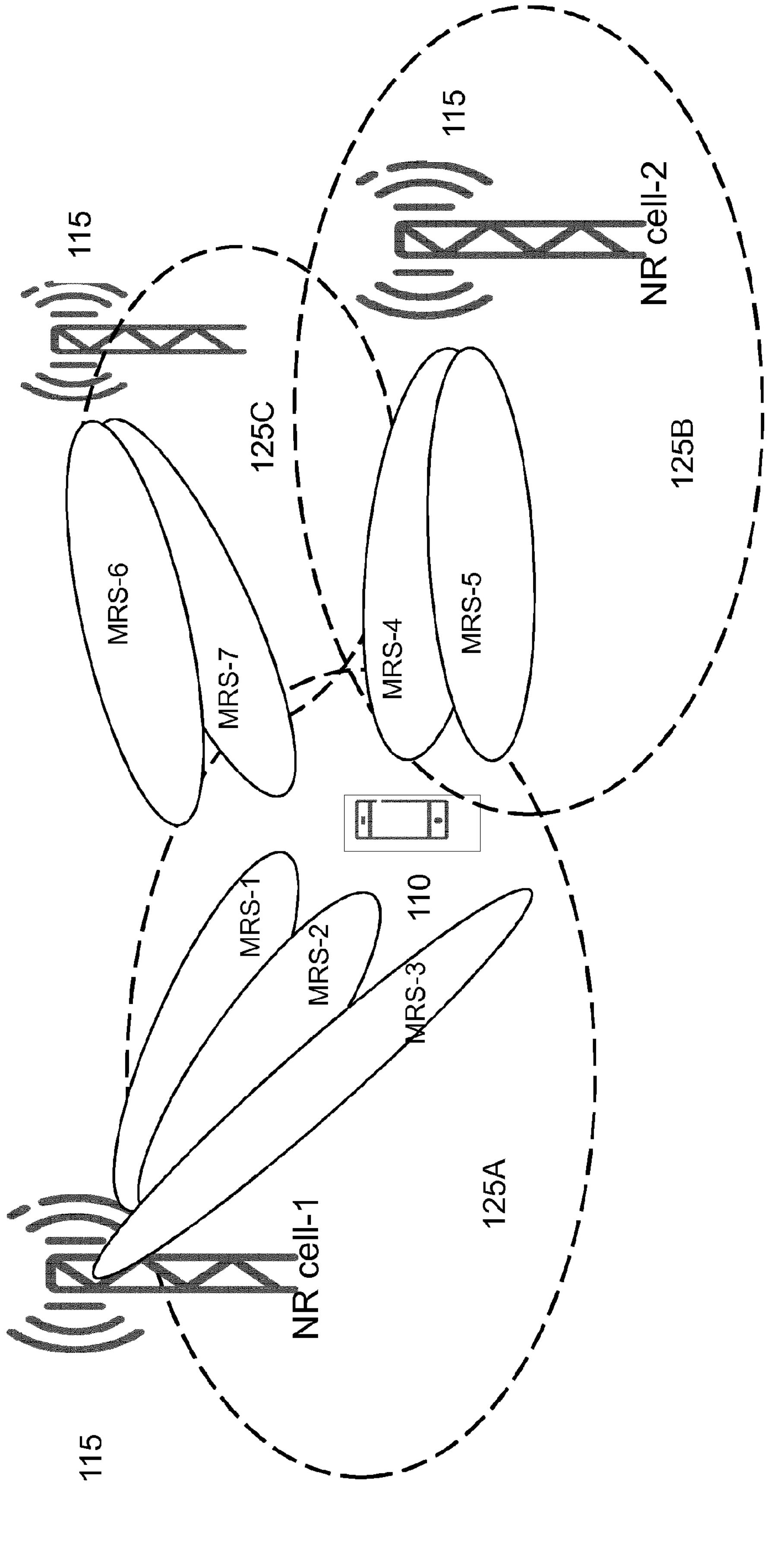
FIG. 2 is an illustration of an exemplary network, in accordance with certain embodiments.

FIG. 2 is an illustration of an exemplary network, in accordance with certain embodiments. As shown in FIG. 2, a serving cell (cell 1) 125A may have three MRSs in the MRS set (MRS-1, MRS-2, and MRS-3) and the other cells (cells 2 and 3) 125B and 125C may have four away MRSs (MRS-4 through MRS-7). These MRSs may be transmitted to a UE 110 by network nodes 115.

CID info may have a local scope (SS/PCI) or of a global scope (e.g. the global cell ID used for ANR). In this discussion, in order to minimize the additional resource impact, this disclosure will focus on the local CID, equivalent to the PSS/SSS information. However, the CID info does not need to assume the same physical format as in e.g. the PSS/SSS transmission. In some embodiments, it is preferable to associate the local CID info in the MRS due to lower resource usage impact.

Options for Including the CID

Because the total length of the BID+CID set will be on the order of 20 bits, it is not suitable for single-message sequence modulation. This disclosure therefore propose multiple approaches of providing the BID-to-CID mapping info.

Adding CID information in MRS transmission may result in transmitting more control information any time the MRS beams are active. In some types of deployments, the per-cell grouping of non-serving MRSs and the associated CID info is not required. Instead, the UE may report each non-serving-cell BID as originating from a different cell, or the MRS transmission features may be used by the UE to infer that certain beams originate from the same cell. The inclusion of the CID field in MRS, or providing the CID info by other means should be configurable. The same principles as discussed may be used if the MRS is not compact in the configured BW, but allocated to non-contiguous groups of REs within the MRS BW.

1. Adding CID as a Sequence-Modulated Field

Figure 3:
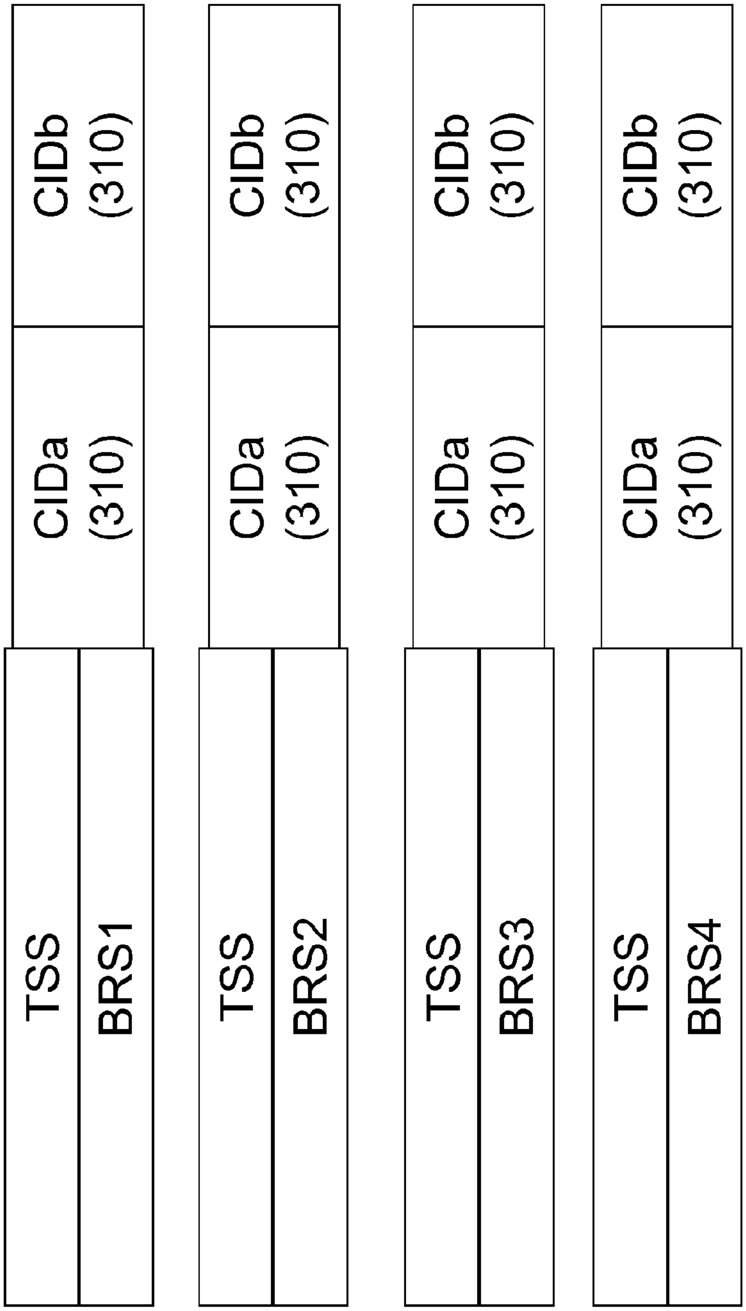
FIG. 3 is an illustration of an exemplary signal, in accordance with certain embodiments.

In this option, the CID 310 info is added as a separate field to the MRS symbol, separate from the TSS+BRS fields, but linked to it in an unambiguous manner using scrambling. As shown in the example of FIG. 3, the CID 310 is transmitted in association with the MRS (TSS/BSR) as two 5-bit sequence modulated sequences. In order to unambiguously associate the CID 310 transmission parts (CIDa 310 and CIDb 310), they are scrambled e.g. with the MRS identity in the TSS and BRS. The CID 310 may be transmitted as a separate transmission from the MRS.

To accommodate 10 bits of CID 310 without requiring excessively long sequences, the CID field is divided into two length-5 sub-fields CIDa 310 and CIDb 310 that are separately sequence modulated, using e.g. M-sequences. The CIDa 310 and CIDb 310 fields are scrambled in the frequency domain with a scrambling sequence derived from the BID in the MRS. The UE thus first detects the MRS in time and frequency domains, next extracts the scrambling sequence, and detects the contents of the CIDa 310 and CIDb 310 fields in the frequency domain. Since scrambling is removed prior to detection, the cross-correlation properties of the CID sequence are not negatively affected by scrambling. This approach keeps the duration of each beam transmission in a beam sweep to a single symbol.

In an example, a UE may receive the MRS and extract the TSS and BRS. The UE may then extract an index from the TSS and BRS. The UE may use the index to get a BID from a mapping. The UE then combines the BID with the TSS and BRS. The UE can get a descrambling code from this combination. The UE may then use this descrambling code to descramble the CID (e.g. CIDa 310 and CIDb 310).

2. Adding CID as a Conventionally Encoded Field

Figure 4:
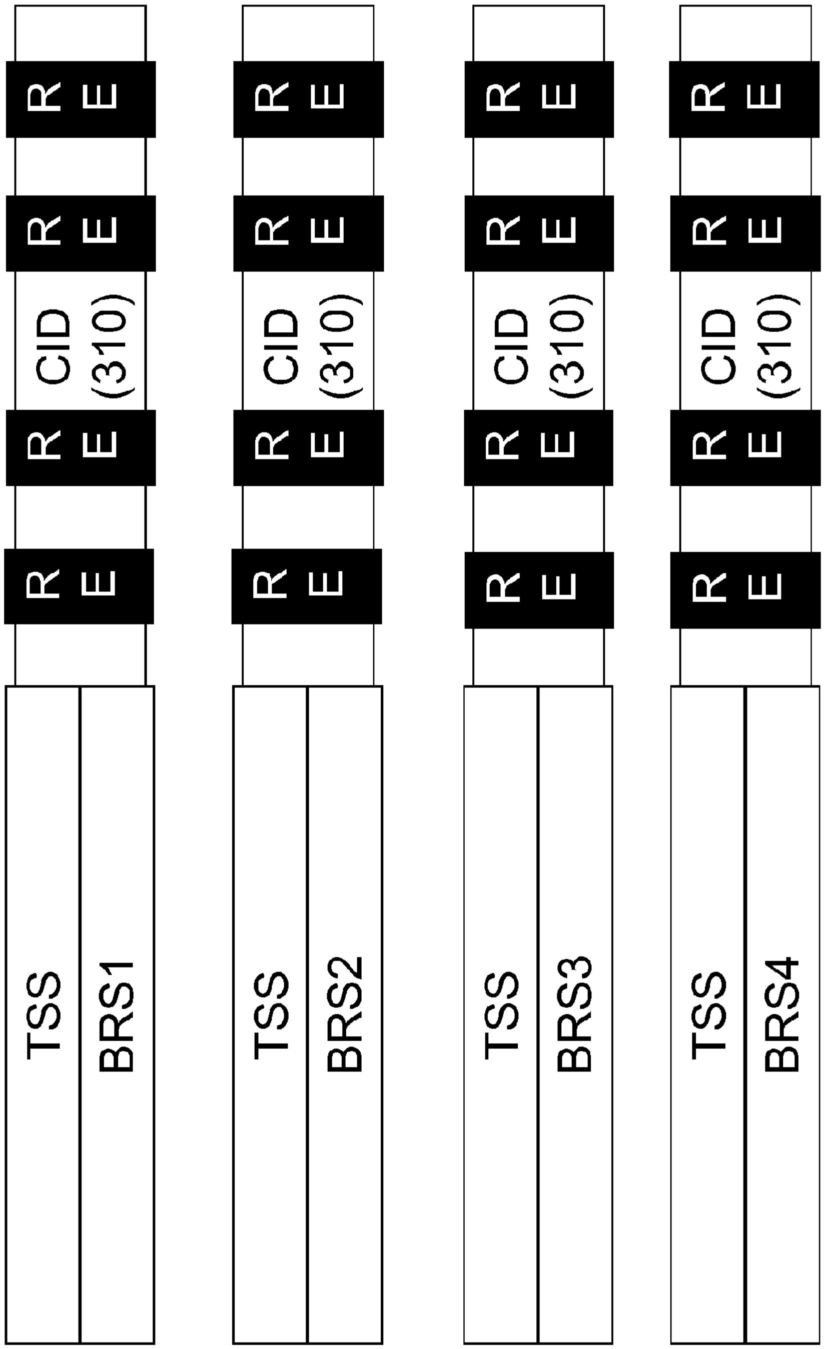
FIG. 4 is an illustration of an exemplary signal, in accordance with certain embodiments.

In this option, the CID info is added as a separate field in the transmitted MRS beam, separate from the TSS+BRS fields, but using conventional modulation and encoding. In the example of FIG. 4, the CID 310 is transmitted in association with the MRS (TSS/BSR) as a "conventionally encoded field" in a physical channel. The physical channel containing the associated CID 310 can be made unambiguous by using a DMRS or a scrambling code derived from the MRS identity.

The CID 310 field may be a sequence of encoded and QAM-modulated symbols occupying REs in the same single symbol as the TSS/BRS fields. The CID 310 field contains REs with DMRS for the purposes of channel estimation, indicated with black in the figure. Encoding scheme and rate of the CID field is chosen appropriately to provide a sufficient link budget. The UE first detects the MRS in time and frequency domains, next extracts the DMRS sequence as a function of the BID, and finally estimates the channel and demodulates/decodes the CID field. As above, this approach keeps the duration of each beam transmission in a beam sweep to a single symbol.

In certain embodiments, this option does not require that a predefined CID sequence be detected. In essence, the CID 310 is communicated in an open channel that carries encoded information. As a result, the channel may contain redundant information. Each channel may communicate resource elements (RE) that are used for channel estimation (e.g., to detect, extract, and decode the CID 310 pieces).

3. Providing CID Using a Physical Downlink Channel (PDCH) Container

Figure 5:
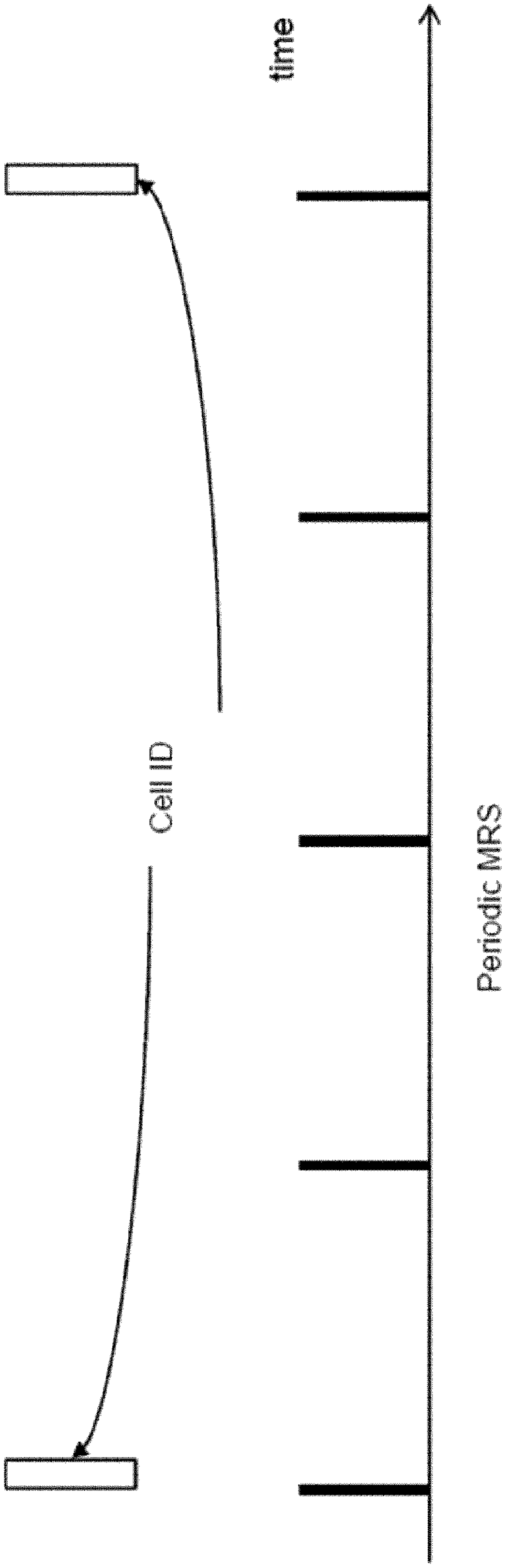
FIG. 5 is an illustration of an exemplary signal timing, in accordance with certain embodiments.

In this option, the CID info is added as a separate PDCH transmission, transmitted with same beamforming as the TSS/BRS fields. In the example of FIG. 5, the CID associated with a particular MRS may be periodically scheduled using a PDCCH/PDSCH configuration derived from the MRS identity. This PDCCH/PDCH configuration is then transmitted using the same beamforming as the associated MRS.

The CID field is a conventional PDCCH/PDCH transmission containing the CID info. Not every MRS transmission needs to be accompanied by the PDCH container. The UE first detects the MRS in time and frequency domains. The BID info maps either to a RNTI for receiving the PDCCH which in turn points to the PDCH. Alternatively, the BID info may map to the PDCH parameters (RBs, DMRS, MCS etc.) directly.

In certain embodiments, the CID is sent asynchronously with the MRS. As a result, the CID is sent with the MRS in some instances and not with the MRS in some instances. The CID does not have to be the next symbol sent after the MRS. The CID may borrow the control channel (e.g. PDCCH). A UE may detect separate CID transmissions on the PDCCH. The MRS is transmitted over a different channel than the CID. Scrambling similar to option 1 and/or option 2 can be performed on the CID and MRS. The UE can receive the MRS and extract a BID from the MRS. The BID maps to the PDCCH.

4. Providing CID Info Via Dedicated Control Signaling to the UE

The UE may be previously configured with mappings between the possible 13TDs conveyed by the MRS and their corresponding CIDs. The MRS transmissions then keep the original format and no CID info is conveyed over the air.

This approach is an efficient solution for deployments with wide-beam, periodic MRS transmissions where the MRS-to-cell mapping changes infrequently. Whenever a change occurs, the NW reconfigures the UE with the updated mapping.

5. Inferring Same Originating Cell from MRS ID Sub-Range

A predetermined set of BID bits conveyed by the MRS may be allocated as locally unique for a given originating cell, forming a group ID. For example, the 4 MSBs in a 10-bit BID could be the same for all beams originating from a certain cell, while the 6 LSBs could be beam-specific.

The BID bits may be conveyed in different dimensions of the MRS signal (time/frequency/TSS sequence/BRS sequence) and the group ID bits extracted upon MRS reception. A special case of separating a group ID field in the BID bits is by transmitting the group ID field as a separate signal that the UE can receive disjointly from the rest of the BID bits in the MRS.

6. Inferring Same Originating Cell from MRS Frequency

Each cell in a local neighborhood is allocated a distinct frequency subband for MRS transmission. All MRSs detected in a certain subband may then be assumed to originate from the same cell.

Figure 6A:
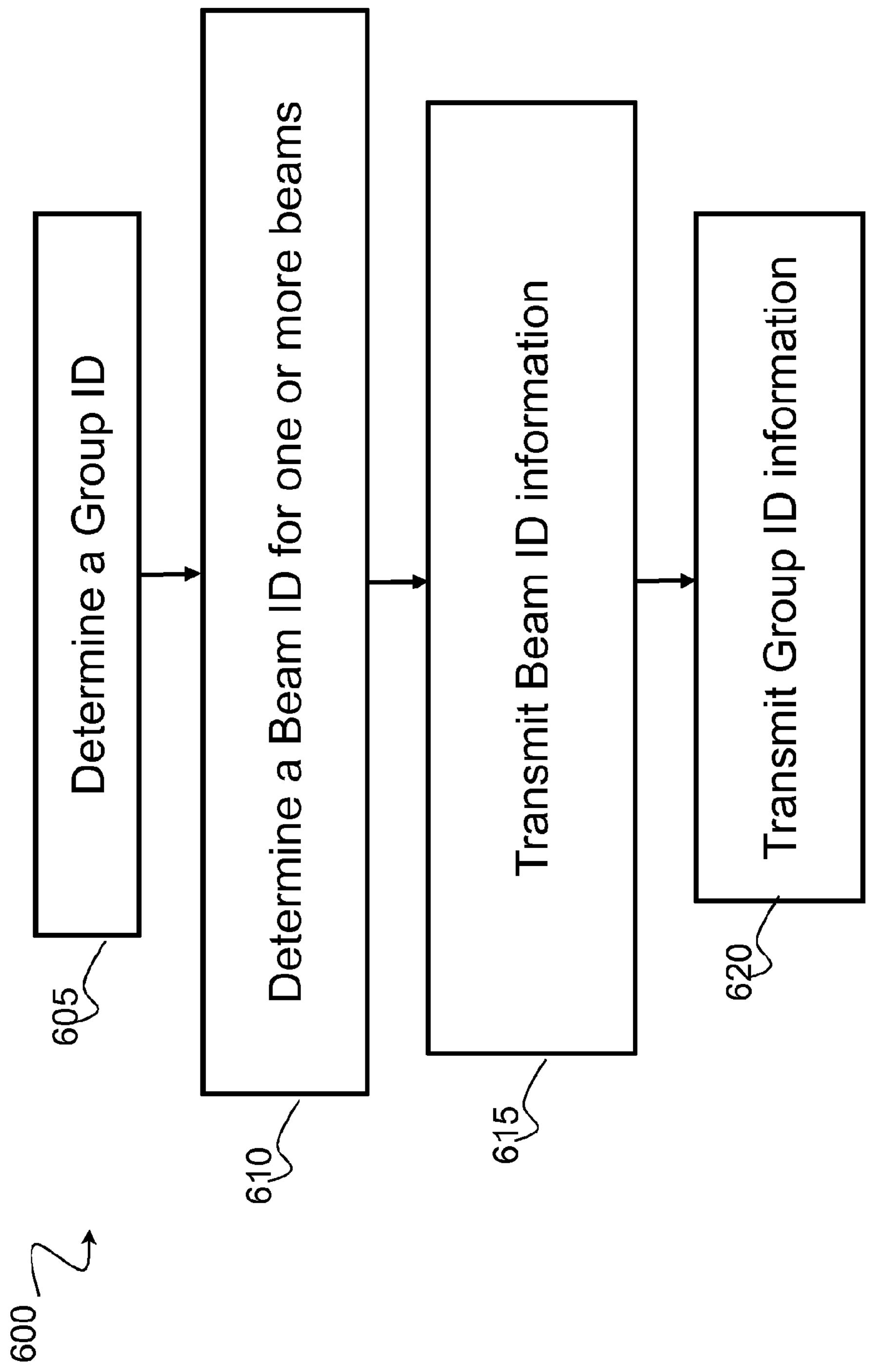
FIGS. 6A-6D are flowcharts showing exemplary methods of beam grouping indication, in accordance with certain embodiments.

FIG. 6A is a flowchart showing an exemplary method 600 of beam grouping indication. In particular embodiments, a network node performs method 600. The network node begins by determining a group ID in step 605. In step 610, the network node determines a beam ID for one or more beams. Then, the network node transmits beam ID information in step 615. In step 620, the network node transmits the group ID information.

Figure 6B:
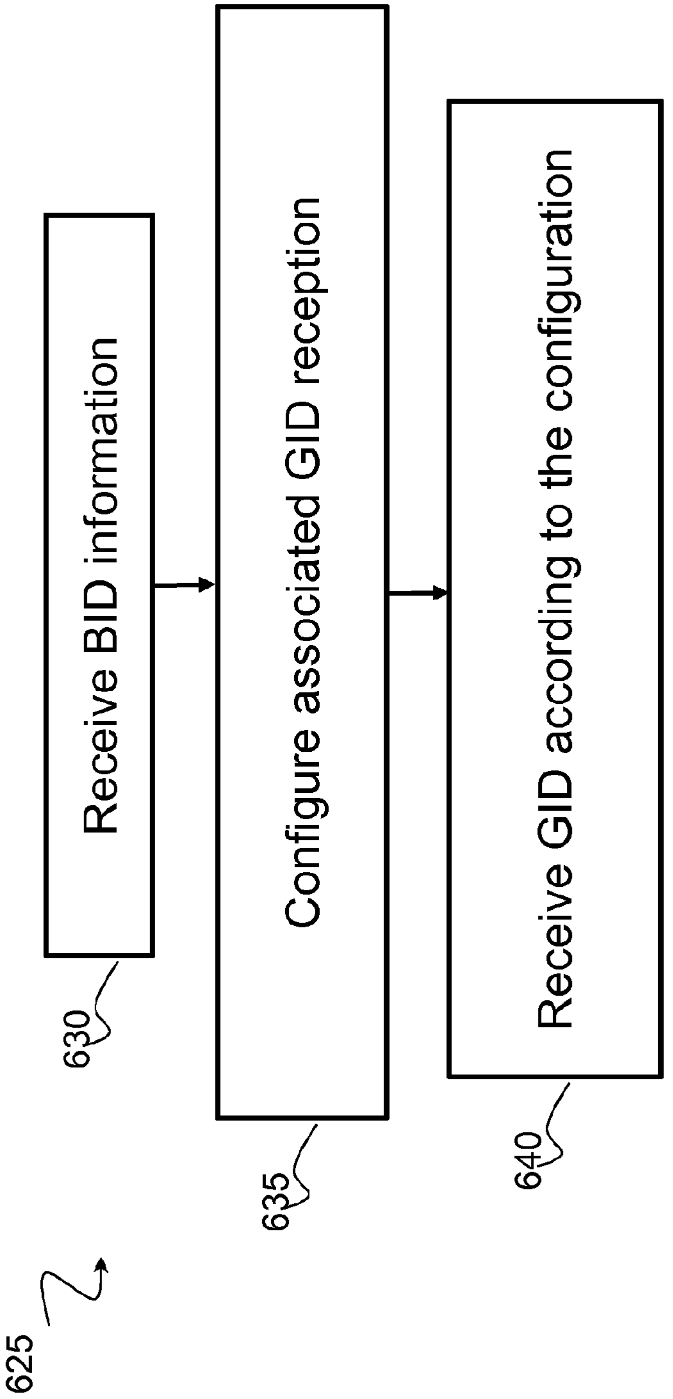

FIG. 6B is a flowchart showing an exemplary method 625 of beam grouping indication. In particular embodiments, a UE performs method 625. The UE begins by receiving beam ID information in step 630. In step 635, the UE configures associated group ID reception. Then, the UE receives group ID information according to the configuration.

Figure 6C:
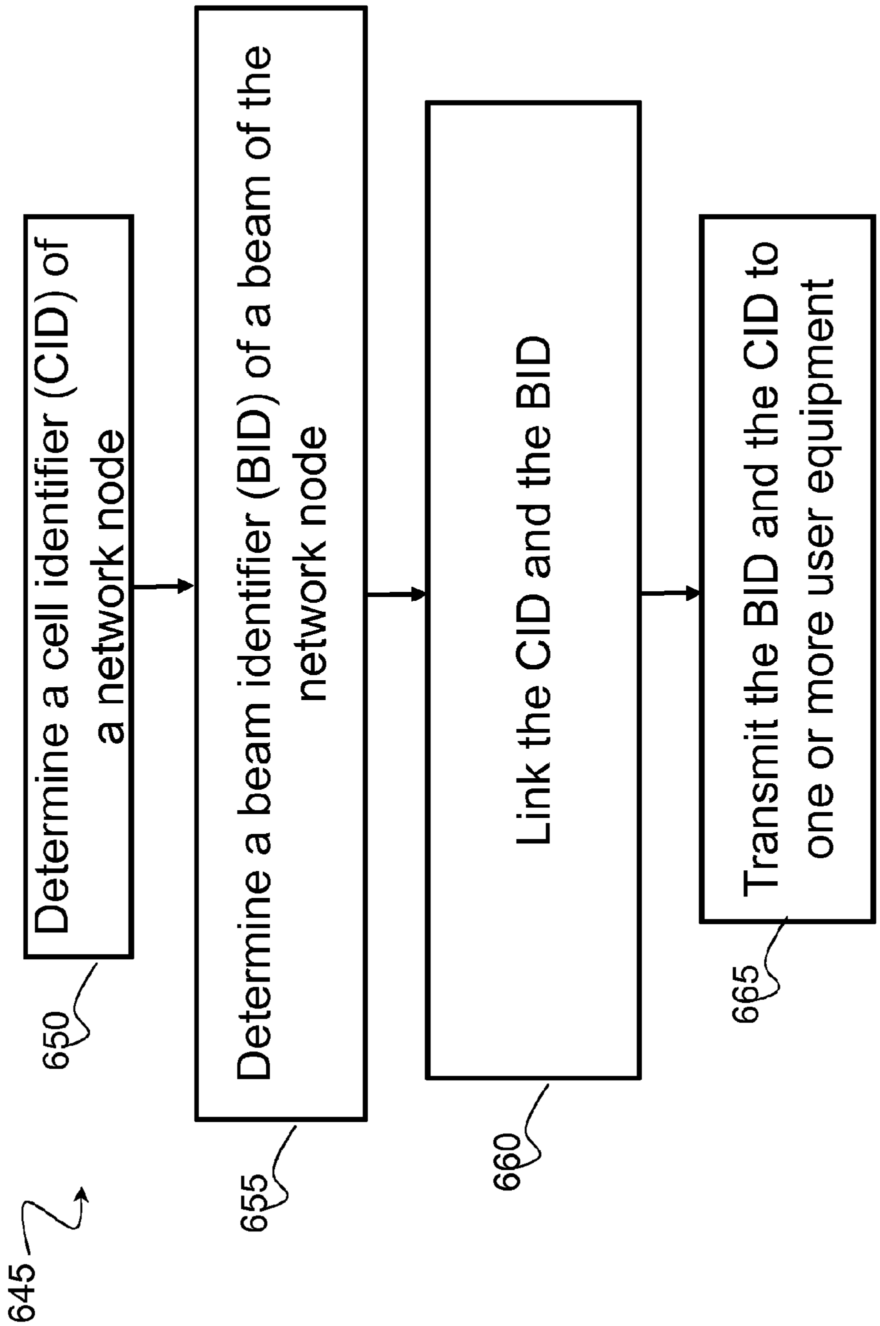

FIG. 6C is a flowchart showing an exemplary method 645 of beam grouping indication. In particular embodiments, a network node performs method 645. The network node begins by determining a cell identifier (CID) of the network node in step 650. The CID may identify a cell served by the network node. The network node then determines a beam identifier (BID) of a beam of the network node. The BID may identify a beam formed by the network node. In step 660, the network node links the CID and the BID. The network node may implement any of the options for linking the CID and the BID described above. In step 665, the network node transmits the BID and CID to one or more user equipment. The network node may transmit the BID and CID in the same transmission or in different transmissions.

Figure 6D:
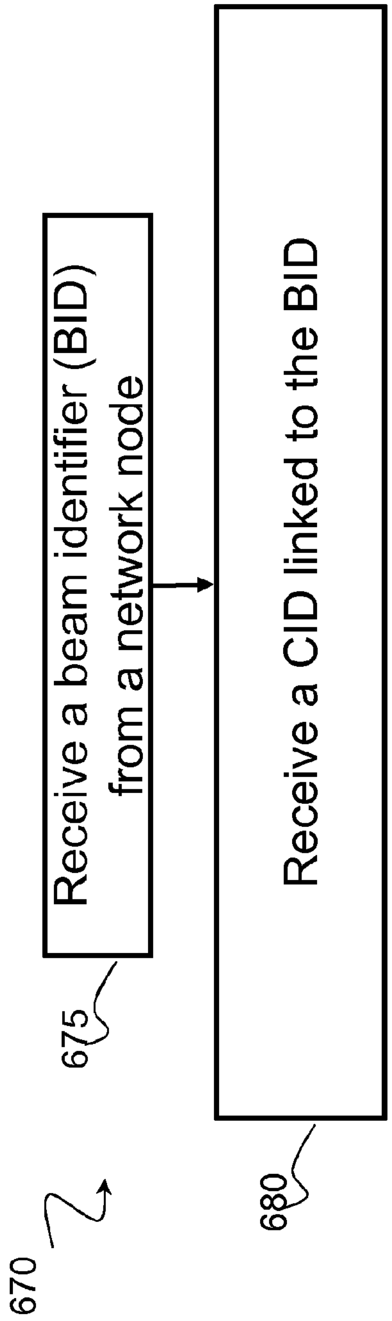

FIG. 6D is a flowchart showing an exemplary method 670 of beam grouping indication. In particular embodiments, a UE performs method 670. The UE begins by receiving a beam identifier (BID) from a network node. The BID may identify a beam formed by the network node. In step 680, the UE receives a CID linked to the BID. The CID may identify a cell served by the network node.

Figure 7:
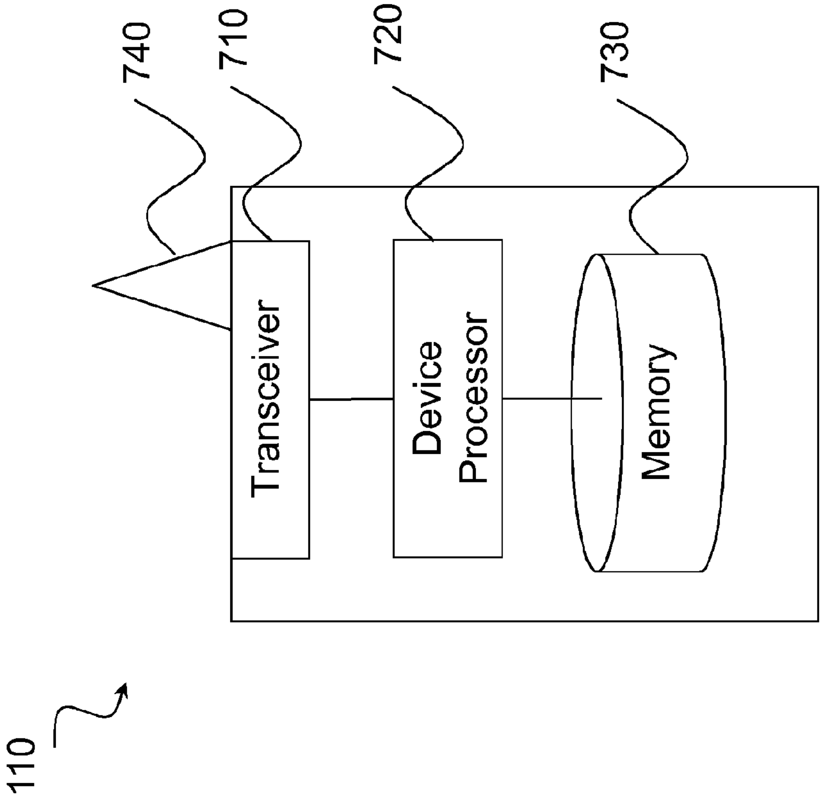
FIG. 7 is a block schematic of an exemplary wireless device, in accordance with certain embodiments.

FIG. 7 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via antenna 740), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110, such as the functions of wireless device 110 described above in relation to FIGS. 1-6B. For example, processor 720 may be configured to receive a BID and a linked CID from a network node. The BID and CID may be received in the same transmission or in different transmissions. In some embodiments, processor 720 may include processing circuitry such as, for example, one or more computers, one or more central processing units (CPUs), one or more microprocessors, one or more applications, one or more application specific integrated circuits (ASICs), one or more field programmable gate arrays (FPGAs) and/or other logic. The processing circuitry may include any combination of electrical components (e.g., resistors, transistors, capacitors, inductors, etc.) that are assembled to direct the flow of electrical current.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 720.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
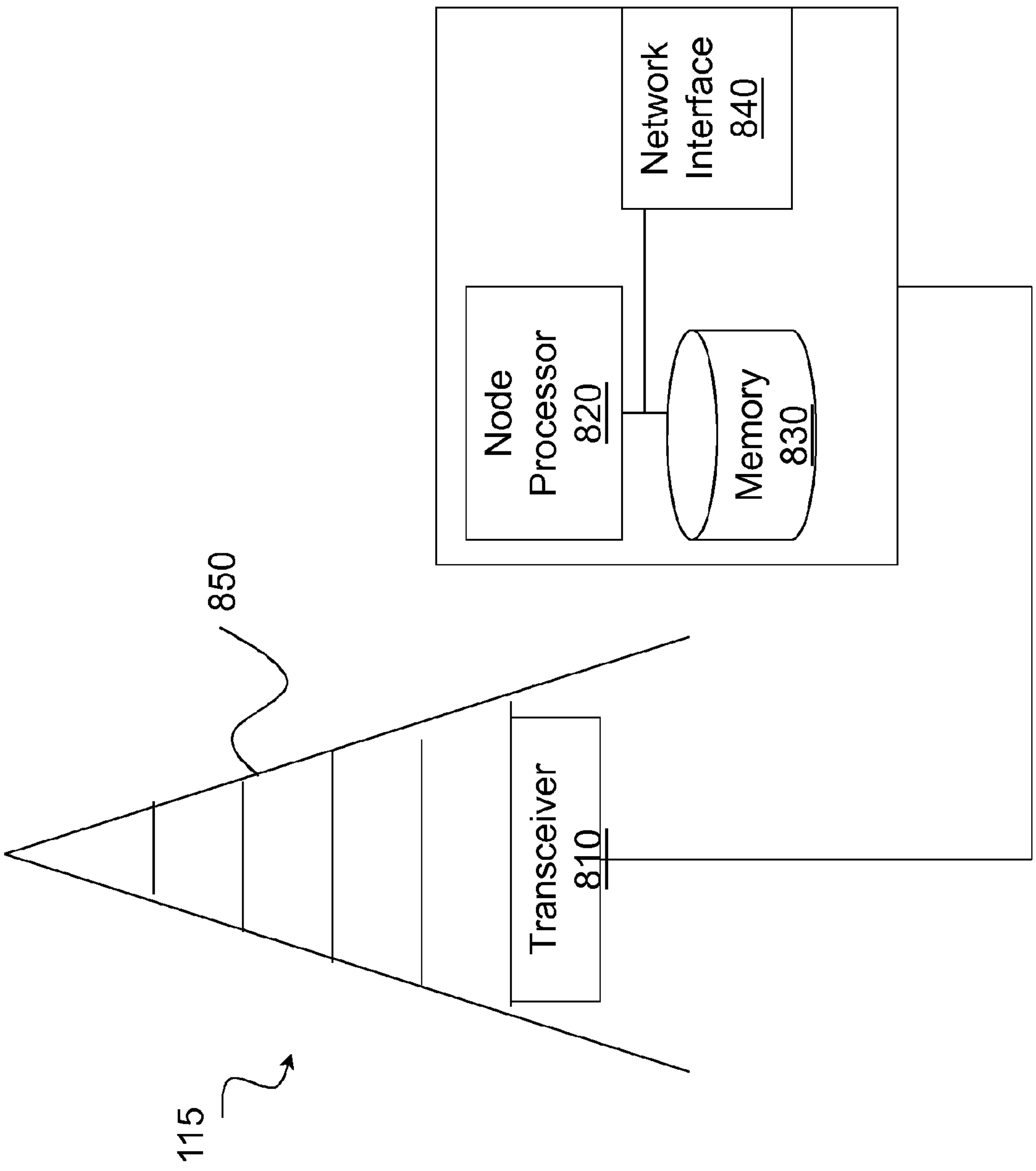
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via antenna 850), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes or radio network controllers, etc.

Processor 820 may include any suitable combination of hardware and software implemented in one or more modules to execute instructions and manipulate data to perform some or all of the described functions of network node 115, such as those described above in relation to FIGS. 1-7 above. For example, processor 820 may determine a BID for a beam and a CID for a cell. Processor 820 may link the BID and the CID using the processes described above such that the CID may be extracted, descrambled, decoded, and/or determined from the BID. Processor 820 may also transmit the BID and the CID to a user equipment 110 using one or more transmissions. In some embodiments, processor 820 may include processing circuitry such as for example, one or more computers, one or more central processing units (CPUs), one or more microprocessors, one or more applications, and/or other logic. The processing circuitry may include any combination of electrical components (e.g., resistors, transistors, capacitors, inductors, etc.) that are assembled to direct the flow of electrical current. Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
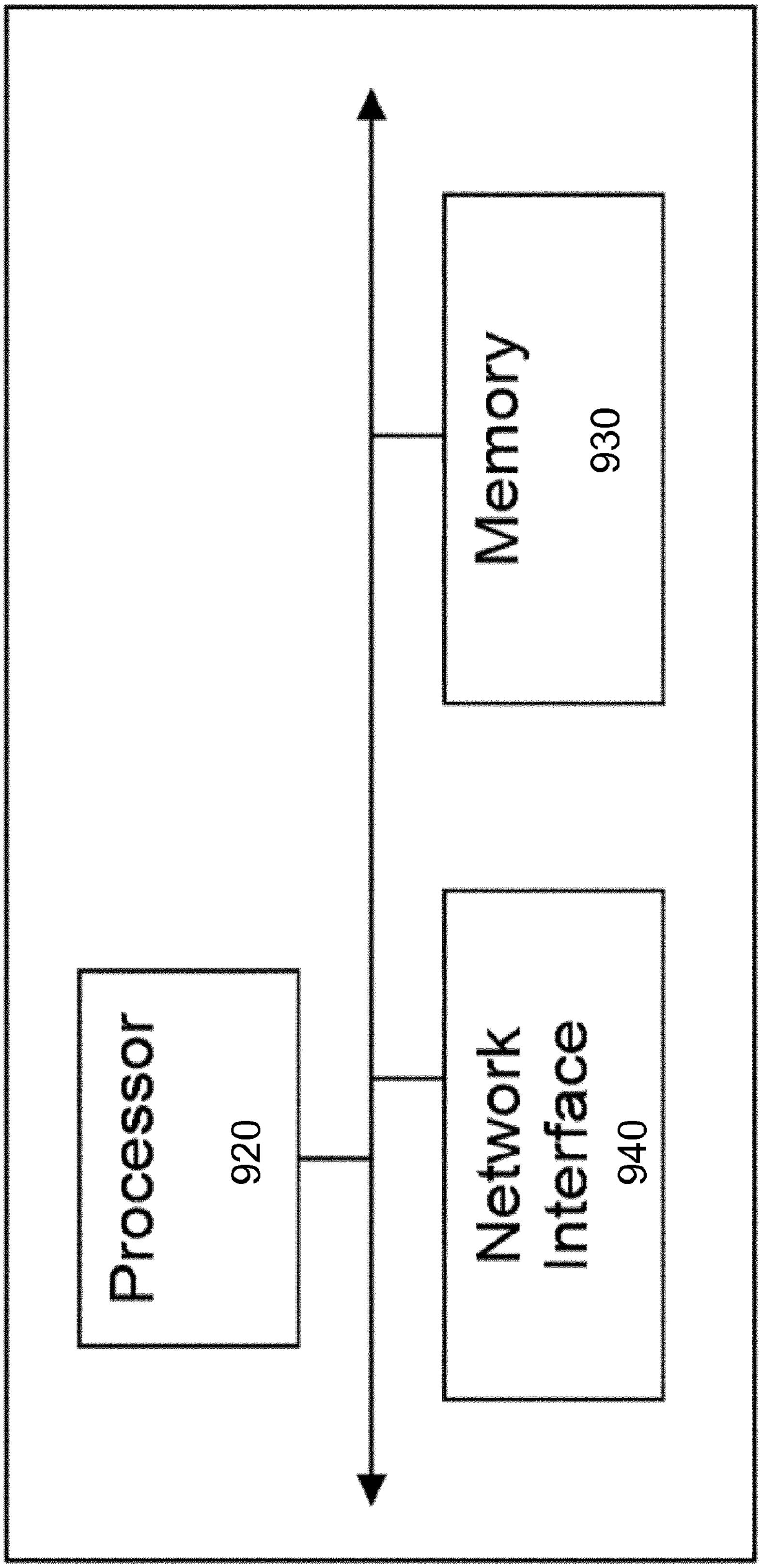
FIG. 9 is a block schematic of an exemplary radio network controller or core network node, in accordance with certain embodiments.

FIG. 9 is a block schematic of an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes, etc.

Processor 920 may include any suitable combination of hardware and software implemented in one or more modules to execute instructions and manipulate data to perform some or all of the described functions of the radio network controller or core network node. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
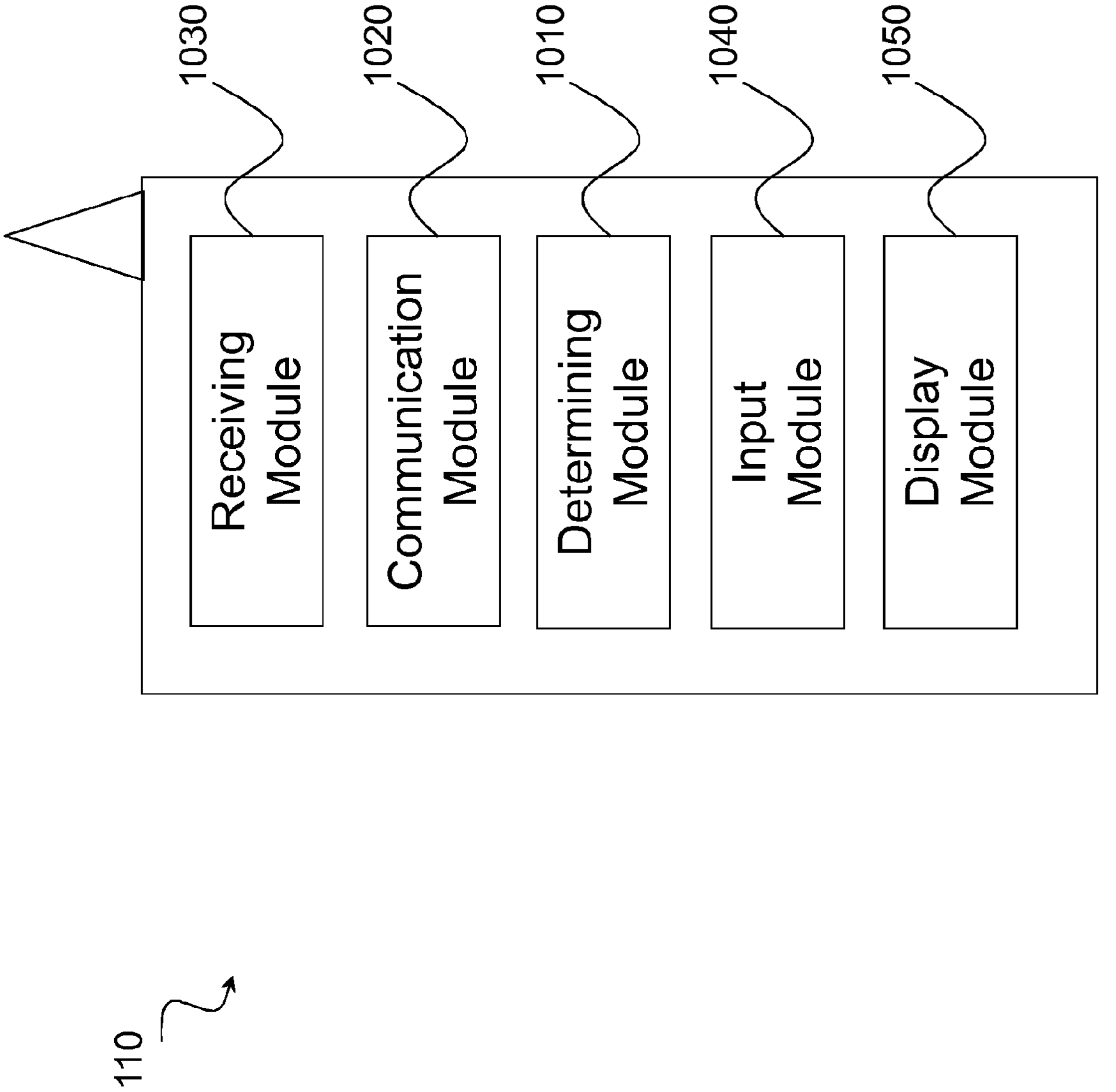
FIG. 10 is a block schematic of an exemplary wireless device, in accordance with certain embodiments.

FIG. 10 is a block schematic of an exemplary wireless device 110, in accordance with certain embodiments. Wireless device 110 may include one or more modules. For example, wireless device 110 may include a determining module 1010, a communication module 1020, a receiving module 1030, an input module 1040, a display module 1050, and any other suitable modules. Wireless device 110 may perform the functions described above with respect to FIGS. 1-6.

Determining module 1010 may perform the processing functions of wireless device 110. For example, determining module 1010 may receive and process beam ID information to determine cell ID information. Determining module 1010 may also receive and process group ID information. Determining module 1010 may further perform channel estimation and beamforming sweeps. Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 described above may, in certain embodiments, be performed in one or more distinct modules.

Communication module 1020 may perform the transmission functions of wireless device 110. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of wireless device 110. As one example, receiving module 1030 may receive beam ID information, group ID information, and cell ID information. The beam ID and the cell ID may be linked. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

Figure 11:
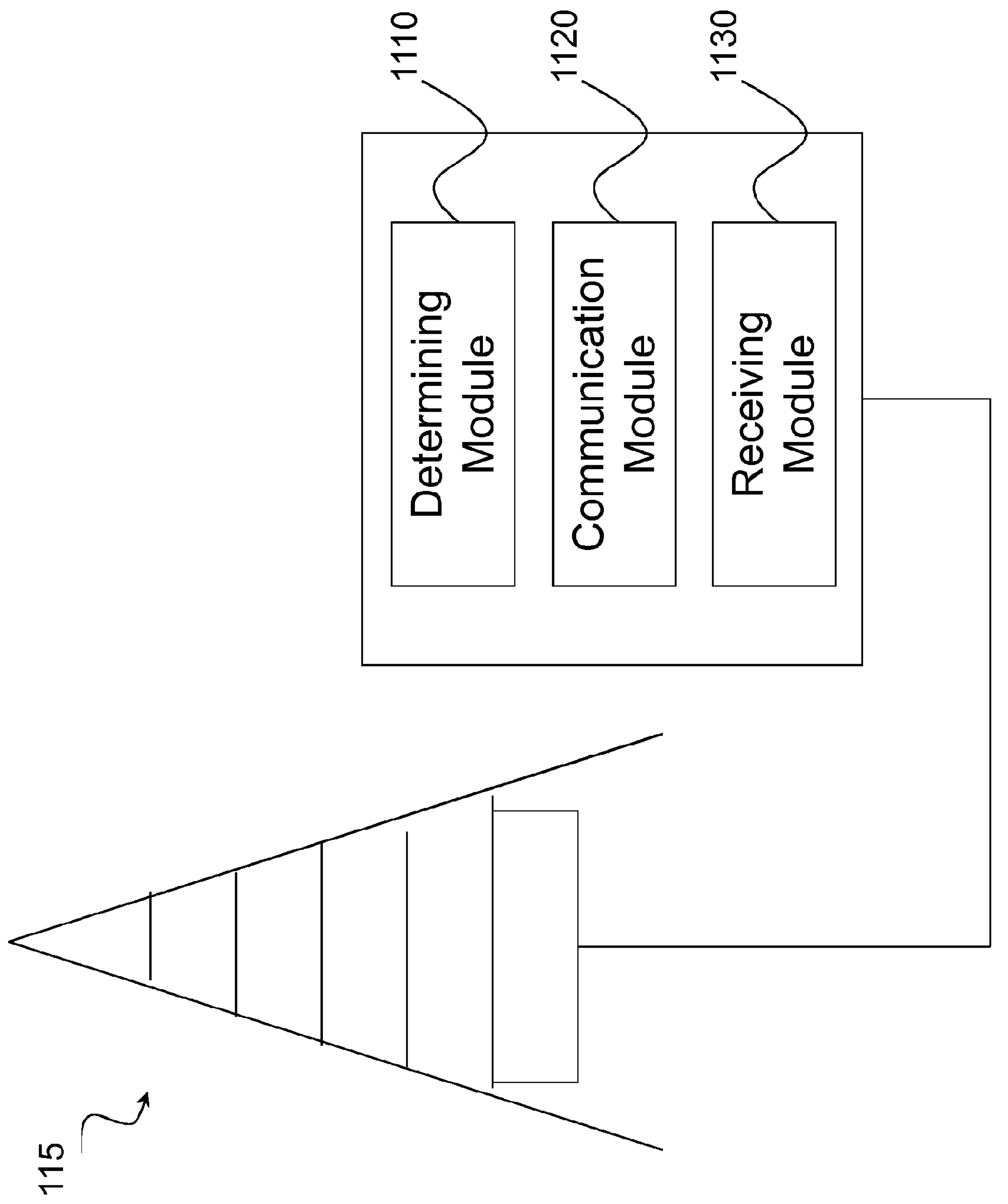
FIG. 11 is a block schematic of an exemplary network node, in accordance with certain embodiments.

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processor 820 described above in relation to FIG. 8. In certain embodiments, the functions of two or more of the various modules may be combined into a single module. Network node 115 may perform the functions described above with respect to FIGS. 1-10.

Determining module 1110 may perform the processing functions of network node 115. For example, determining module 1110 may determine group ID information, beam ID information, and cell ID information. Determining module 1110 may link a beam ID to a cell ID. Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 may, in certain embodiments, be performed in one or more distinct modules. For example, in certain embodiments some of the functionality of determining module 1110 may be performed by an allocation module.

Communication module 1120 may perform the transmission functions of network node 115. As one example, communication module 1120 may transmit group ID information, beam ID information, and cell ID information. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. Receiving module 1130 may receive any suitable information from a wireless device. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

NR Synchronization Signals for Idle and Connected Mode Mobility Example

In LTE, an IDLE UE selects and reselects its serving cell. The LTE cell is in general defined by its synchronization signals (PSS/SSS). Upon detecting and synchronizing with the PSS/SSS the UE knows the cell TD (PCT). Tightly connected with the PSS/SSS is also the acquisition of system information. Hence, PSS/SSS serves the purpose of an idle mode synchronization signal.

In LTE, an RRC_CONNECTED UE measures the quality of neighbor cells, and evaluate them as potential handover candidates. Here, the PSS/SSS is again used to identify the cell, and the measurement on the corresponding CRS is reported to the serving eNodeB, which uses the report to prepare the target eNodeB for the coming handover. Here, the PSS/SSS serves the purpose of a connected mode synchronization signal.

In LTE, the PSS/SSS is transmitted every 5 ms. For extreme handover scenarios, such frequent transmissions are required to ensure good handover performance. Hence, the period has been selected to fulfil the CONNECTED mode requirement. For IDLE mode performance, such frequent transmissions are unnecessary: adequate IDLE mode performance may be obtained with much sparser transmissions. With small additions to the standard, e.g., introduction of an IDLE mode measurement window, sufficient IDLE mode performance can in many deployments be obtained with an idle mode synchronization signal periodicity of 100 ms. Hence, connected mode synchronization signals may need to be frequently transmitted, whereas the idle mode synchronization signals can be transmitted with low periodicity.

Figure 12:
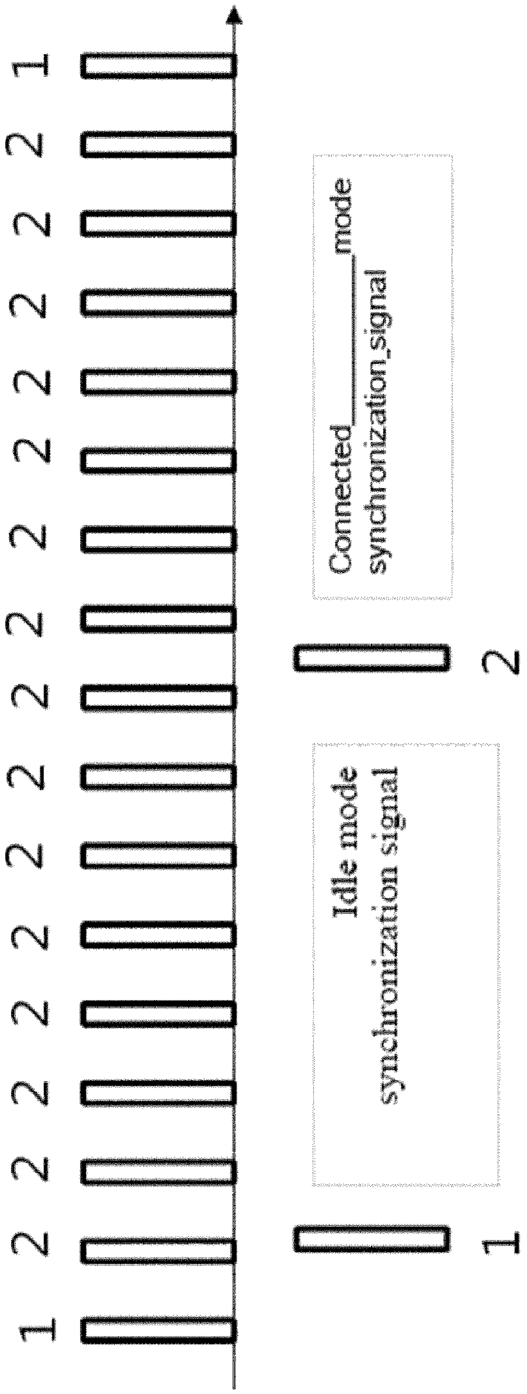
FIGS. 12-15 show example implementations for NR synchronization signals for idle and connected mode mobility.

By using sparse transmission of signals in IDLE mode and more frequent transmissions as soon as any RRC_CONNECTED UE needs to be served, network energy consumption can be minimized. One step in that direction was taken in the small cell enhancements work, where the PSS/SSS was sparsely transmitted on a carrier which had not been activated for any UE. Additional PSS/SSS were then transmitted when the carrier was activated for at least one UE. The situation is illustrated in FIG. 12. FIG. 12 shows the transmission of idle mode and connected mode synchronization signals. The periodicity of the idle mode synchronization signals is chosen to obtain competitive performance for idle mode procedures: cell reselection, system information acquisition and random access.

Furthermore, the system becomes more future compatible, since there are less always-on signal transmissions that need to be considered when designing future transmissions schemes. In addition, with sparse transmission of always-on signals, the amount of overhead can be kept to a minimum, since signals are only frequently transmitted when needed. Note that even for UEs in RRC_CONNECTED mode, 5 ms periodicity is only required to handle extreme situations. In almost all situations, sparser transmissions are sufficient also for connected mode procedures.

Finally, when deployed in unlicensed spectrum, frequent transmission (e.g. every 5 ms) of Idle mode signals is not allowed. For such deployments, sparser transmissions must be utilized. Such a sparse transmission scheme has been introduced in LAA, and is also being introduced in Multe-Fire. NR should be designed from the beginning to operate in unlicensed bands, as well as under other licensing schemes.

Sparse transmission of idle mode synchronization signals is important for network energy consumption and future compatibility. Operation in unlicensed bands may require that the Idle mode signals are sparsely transmitted.

In NR, idle mode procedures should fulfil all relevant KPIs with sparsely transmitted, e.g., every 100 ms, synchronization signals. The UE may rely on additional synchronization signals when in RRC_CONNECTED mode.

To fulfil the requirements on idle mode procedures with sparsely transmitted synchronization signals, additional functionality may have to be introduced on the network side. For instance, the network may provide a measurement window, similar to the DMTC window in LAA, to aid the UE during cell reselection, and the network then ensures that all relevant idle mode synchronization signals are transmitted in that measurement window.

As was previously mentioned, sparse transmission of idle mode signals has been introduced also in LTE for specific deployments, e.g., in small cells, or for operation in unlicensed bands. For NR, such operation may be extended to more deployments. Only in rare cases, frequent transmission of idle mode signals should be required.

One of the most repeated motivations for 5G is that 5G should enable full use of advanced antennas. Both analog and digital beamforming should be supported, and provide extended coverage, increased cell-edge throughput, and improved capacity. When the deployment is dimensioned to provide high cell-edge bitrates by using an advanced antenna system, signals such as system information and reference signals for cell reselection and initial access can still achieve sufficient coverage with wide-beam or even omni-directional transmission. Still, the advanced antenna is crucial in connected mode, where it is used to boost data rates to individual UEs. To perform measurements and to execute the handover to a target node, the UE must be able to receive the connected mode synchronization signal at the same time as it is receiving data. In NR, it should be possible to receive connected mode synchronization signals while at the same time receiving massively beamformed data.

Figure 13:
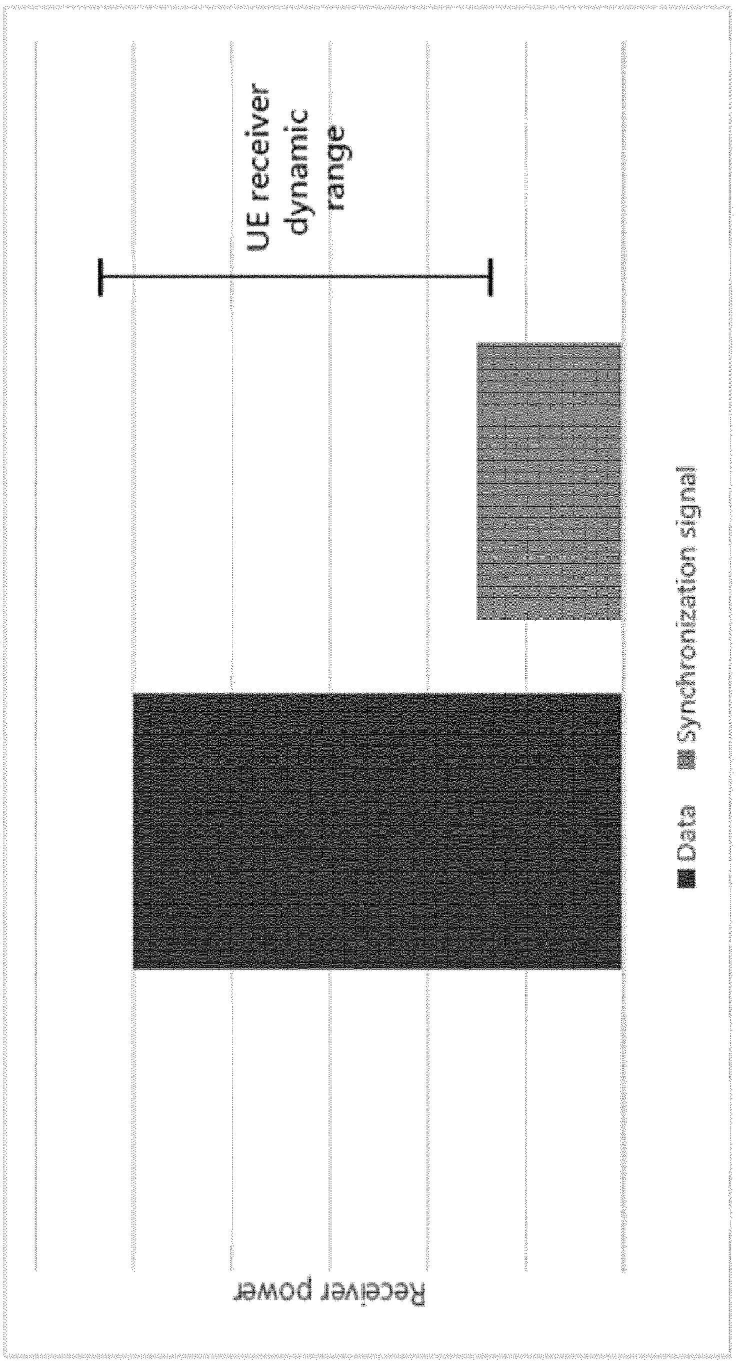

Naturally, the power of the signal received at the UE will be high as a result of the beamforming. To enable simultaneous reception of the data signal and the synchronization signal, they must be received at the UE with similar powers. To be more precise, the received power of both signals should fall inside the dynamic range of the UE receiver. This situation is depicted in FIG. 13. FIG. 13 shows the received power of the data signal and the synchronization signal should fall in the dynamic range of the UE receiver.

The requirement applies to the connected mode synchronization signal. When the UE is in IDLE mode, it is not receiving data using high-gain beamforming, and the dynamic range problem in FIG. 1 does not occur.

To circumvent the issue of simultaneous reception of omni-transmissions and beamformed transmission, transmission gaps in the beamformed transmissions may be introduced. This transmission gap should be long enough so that all relevant intra-frequency neighbors can be measured. There are two major drawbacks associated with this approach: i) there is a loss in performance due to the overhead ii) the neighboring connected mode synchronization signal transmissions should be coordinated with the transmissions gaps. Hence, even with frequent connected mode synchronization signal transmissions, the UEs cannot perform intra-frequency measurements at any time.

If transmission gaps are undesirable, any signal that should be received at the same time as the beamformed data transmission should be beamformed as well so that it falls in the UE receiver window. Of course, this is true also for the idle mode synchronization signal. Hence, if the idle mode synchronization signal should be received in connected mode, it should be beamformed as well, even when beamforming is not required for coverage reasons. This beamforming of the idle mode synchronization signal leads to increased overhead for system information provisioning. It also complicates the network planning.

As previously explained, broadcast of system information (SI) is tightly related to the transmission of the idle mode synchronization signal. To broadcast SI, it is highly desirable to be able to rely on SFN (single-frequency network) transmission. Minimal system information is well-suited for SFN transmission: the SI is often the same over large areas, it should be provided via broadcast and coverage on the cell border is challenging. In NR, it should be possible to distribute the system information using SFN transmission over many TRPs.

As the idle mode synchronization signal may be used as the synchronization source used to receive some of the SI, it should use the same transmission scheme as the SI. When the idle mode synchronization signal is transmitted over such an SFN cluster, the UE is unable to distinguish the idle mode synchronization signals transmitted from individual TRPs. When using SFN to distribute SI, the idle mode synchronization signal cannot be used to identify an individual TRP within the cluster as a connected mode handover target.

If the SFN signal is used as a target for a connected mode handover measurement, the UE would be handed over to the whole SFN cluster. Additional procedures would then be required to find the best TRP within the SFN cluster.

To enable SFN transmissions in idle mode and to enable reception of the connected mode reference signals in the presence of massively beamformed data transmissions, the network could use different beamforming for idle mode SS transmissions in comparison with connected mode SS transmissions.

Dynamic load balancing is the procedure where the network redistributes traffic between network nodes. The main motivation for dynamic load balancing is to off-load traffic from a heavily loaded node to a node with low load.

With a separate connected mode synchronization signal, traffic can be handed over from an overloaded cell simply by reducing the transmit power of that signal. As initial access is still performed using the idle mode synchronization signals, the accessibility of the system is unaffected. If the connected mode mobility is based on the idle mode synchronization signal, this procedure is not possible: any adjustment of the transmit power of the idle mode synchronization signal would impact the initial access performance, and hence the basic coverage of the system.

Figure 14:
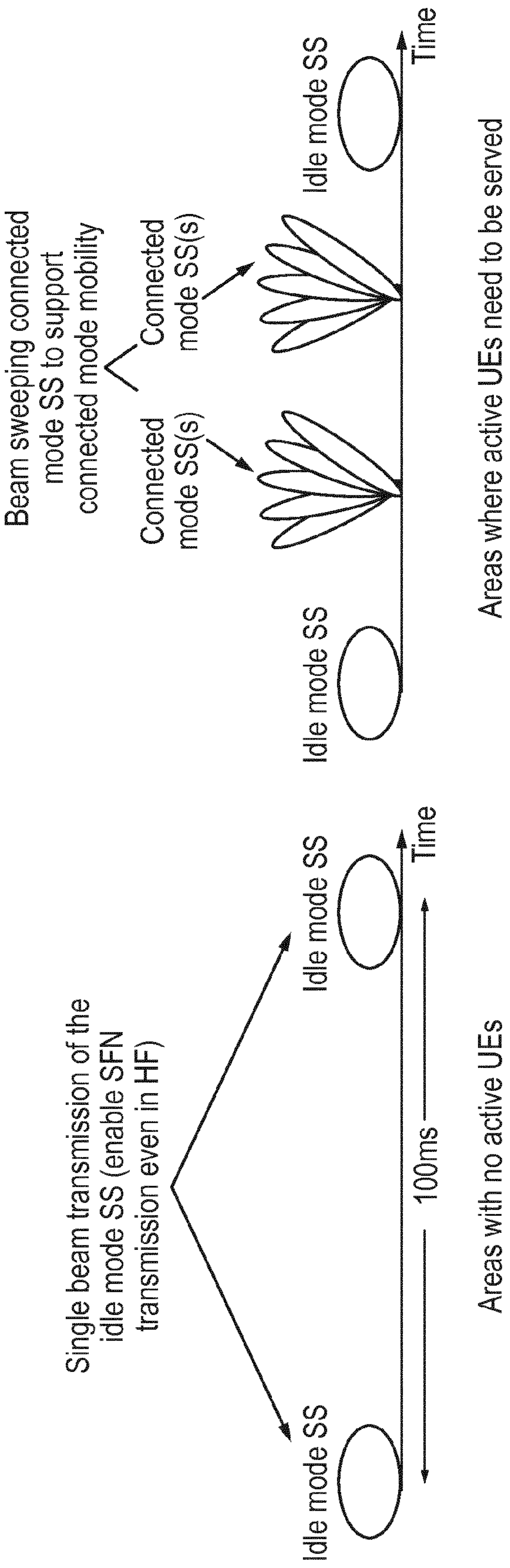

Performing dynamic load balancing in a system with one synchronization for both idle and connected mode should instead rely on mobility thresholds in individual UEs. Not only would this procedure be slower, it would require that the threshold for every single UE is changed. With a separate connected mode synchronization signal, dynamic load balancing can be efficiently performed. FIG. 14 shows different beamforming of synchronization signals in idle mode (wide beam) and connected mode (narrow multi-beam) to enable SFN transmission and reception of connected mode reference signals under the presence of massively beamformed data respectively.

Figure 15:
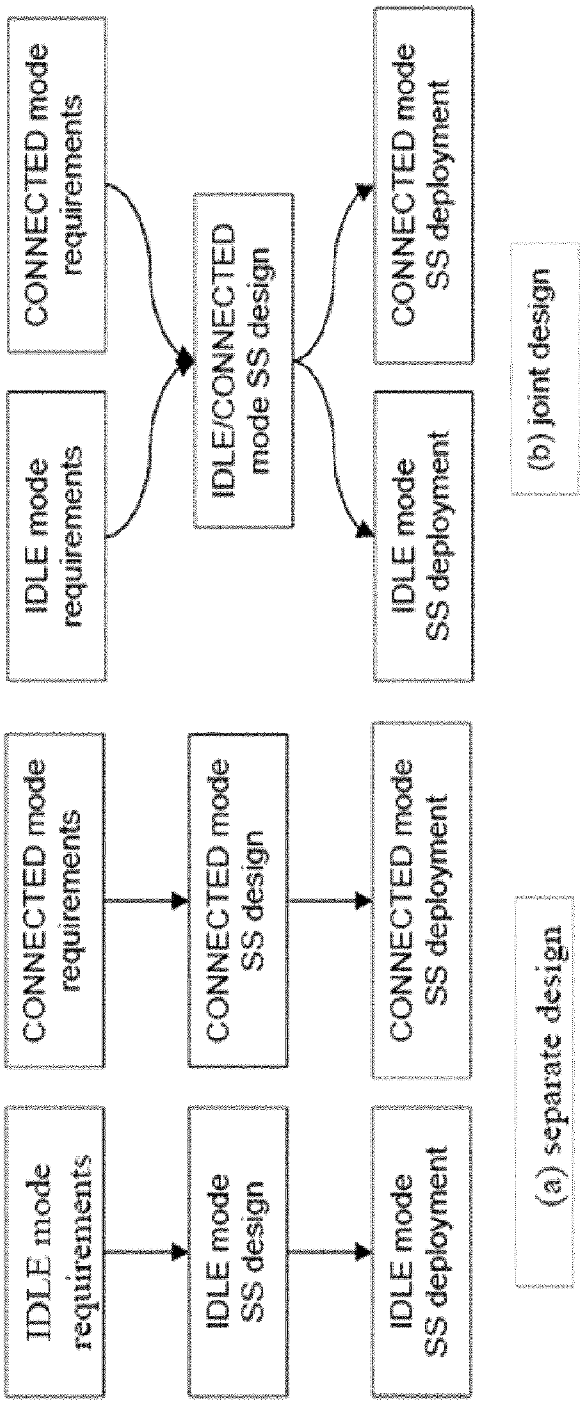

The requirements on the idle mode and connected mode synchronization signals are at least to some extent different. From this insight, there are now two ways to approach the problem, as illustrated in FIG. 15. In approach (a), the synchronization signals are designed separately to fulfil the IDLE mode and CONNECTED mode requirements. Thus, the idle mode synchronization signal is designed to consider the requirements from idle mode UEs and the connected mode synchronization signal is designed to consider the requirements from connected mode UEs. This results in that each signal is optimized for its individual purpose, and the resulting deployment is efficient. It is then quite likely that two signals that are not identical may result. In approach (b), one synchronization signal is designed to fulfil the superset of the requirements for IDLE and CONNECTED mode, resulting in a compromise design. The synchronization signal is then deployed to fulfil the needs of IDLE and RRC_CONNECTED UEs. There may be one signal design to capture in the standard.

The requirements of IDLE mode and CONNECTED mode synchronization signals are in many cases quite different. Thus, RAN1 assumes that a UE in RRC_CONNECTED mode may rely on a DL signal different from the idle mode synchronization signal for the purpose of connected mode mobility measurements.

On NR DL Mobility Measurement Signal Design Example

In R1-1609668, "NR Synchronization signals for idle and connected mode mobility", Ericsson, 3GPP TSG-RAN WG1 #86bis, Lisbon, Portugal, Oct. 10-14, 2016 (incorporated herein by reference), the need for active mode mobility signals is discussed that follow the self-contained principle and support synchronization, TRP identification, and signal quality measurement functions. In this paper, we propose a signal format design for the active mode mobility RS.

As stated in R1-1609668, “NR Synchronization signals for idle and connected mode mobility”, Ericsson, 3GPP TSG-RAN WG1#86bis, Lisbon, Portugal, Oct. 10-14, 2016, the DL mobility measurement signal should fulfil the following functions:

Allow coarse symbol T/F synchronization

Provide TRP or beam identification

Allow link signal quality measurements with sufficient quality.

One important feature is that the mobility signals should support measurements of candidate link qualities of signals from TRPs that may not be tightly (CP-level) synchronized with the serving link signal. To support required DL mobility features, a self-contain signal design must contain features for synchronization, identification, and quality measurements.

The MRS should support efficient mobility beam sweeping (TX) and scanning (RX). In traditional designs, e.g. PSS/SSS, the different fields. In designs employing multiple symbols to separate transmit the different parts of the MRS, the duration of the sweep and scan times are multiplied by the number of symbols required.

Figure 16:
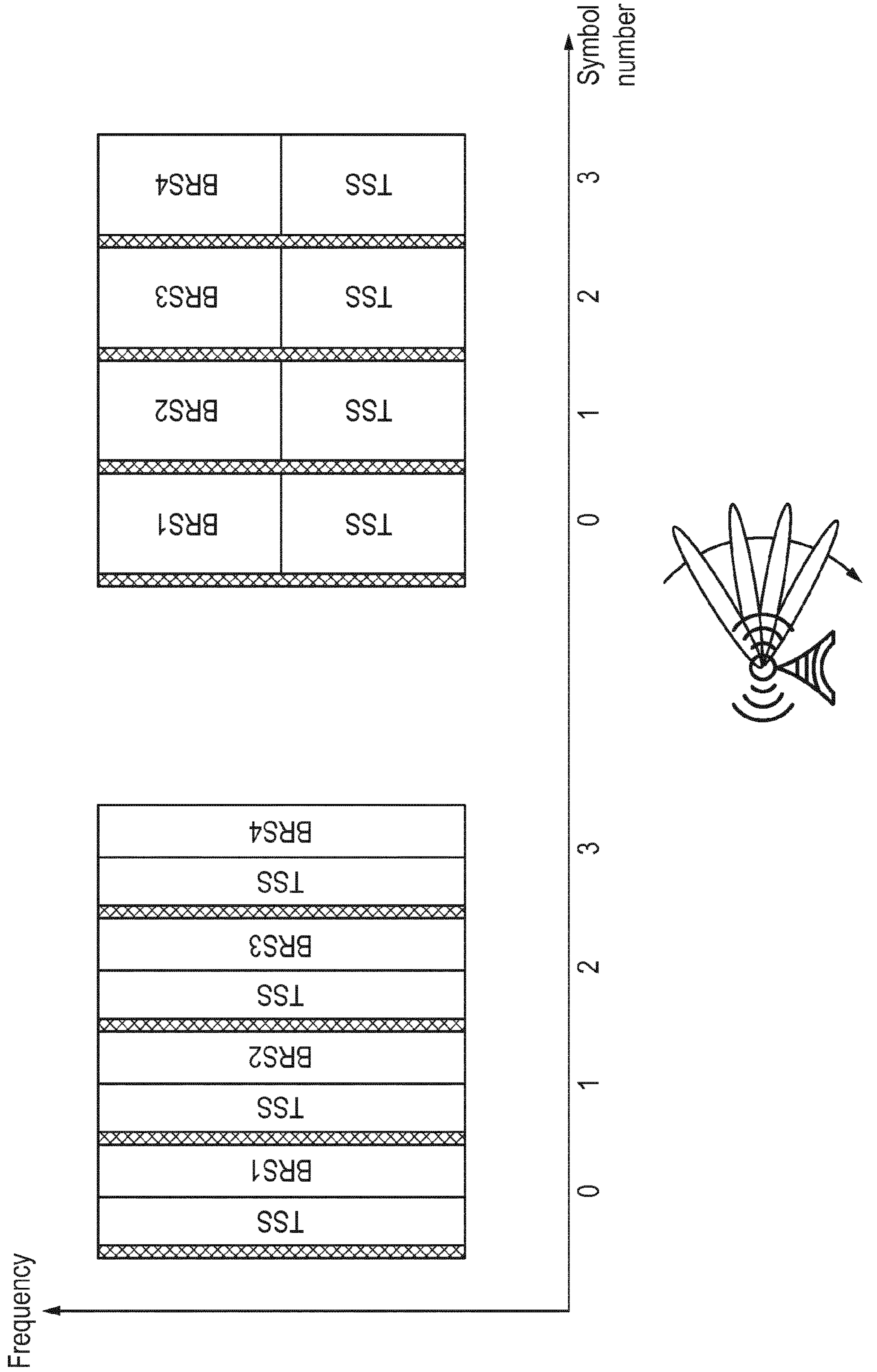
FIGS. 16-17 show example implementations for NR DL mobility measurement signal design.

To provide these functions, the signal format depicted in FIG. 16 is proposed. The overall channel is referred to as the SCH, and the signal. The signal consists of two fields, a synchronization field, here called TSS, and a link (cell or beam) identity field, here celled BRS. The fields are multiplexed into a single OFDM symbol that halves the beam sweeping duration for a given number of beams. The use of the MRS symbols for beam sweeping is also illustrated by FIG. 16. Beams from the same TRP may use the same TSS, while the BRS fields identify individual beams. FIG. 16 shows MRS signal design consisting of TSS and BID fields (T- and F-concatenation) and the use of multiple MRSs in sweeping.

While the figure shows equal resource allocation to the two fields, they may be allocated unequally.

The TSS field, conceptually similar to the PSS in LTE, is preferably a Zadoff-Chu sequence which have been used in LTE for initial timing synchronization. A single sequence, or a small number of them, should be used to minimize the UE search effort.

The BRS sequence, similar in function to the SSS in LTE, should be a pseudo-random binary sequence, e.g. an M-sequence or a Gold sequence. Tens to hundreds of BRS sequences with good cross-correlation properties should be accommodated.

Figure 17:
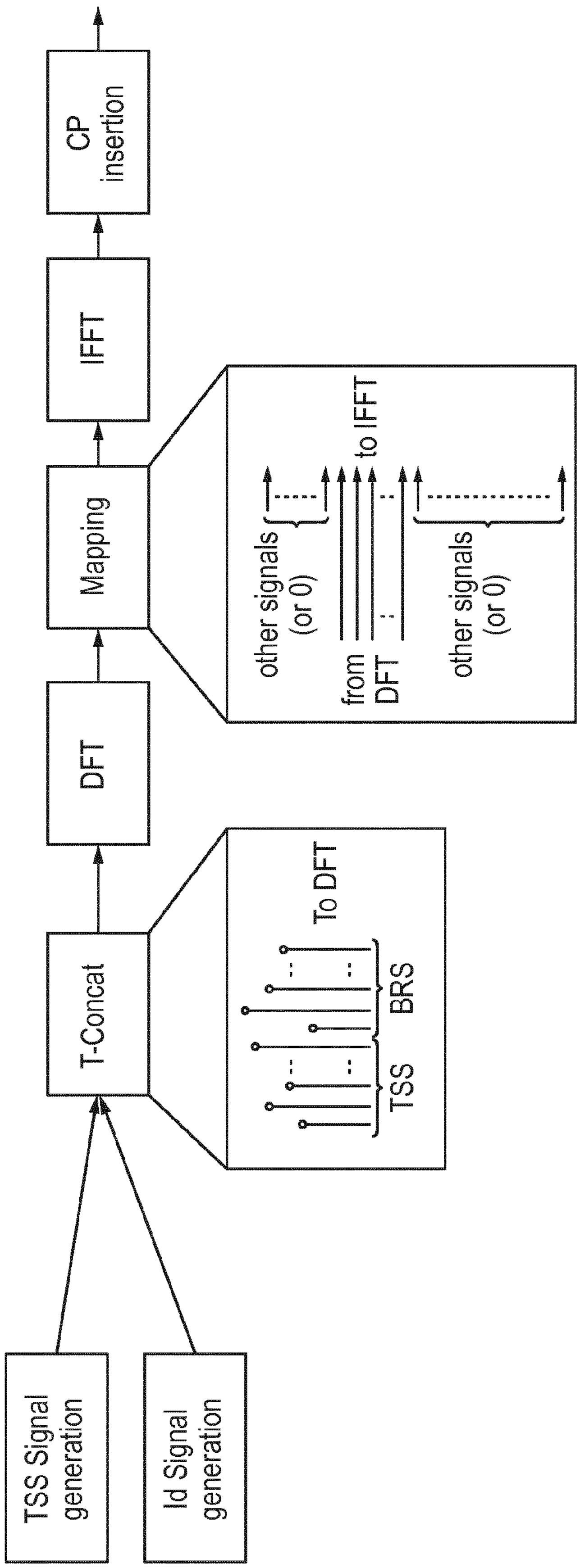

FIG. 17 shows a transmitter structure to generate the MRS and MRS signal generation (T-concatenation). Time-domain concatenation of is preferred because it may maximize the frequency diversity for both fields and allows the full MRS frequency span to be used for TSS-based timing estimation.

The UE receiver for first search for the TSS sequence in the time domain using appropriate timing and frequency search grid. After obtaining symbol timing and frequency synch, the FFT is applied and MRS subcarriers are extracted. After IDFT of the MRS subcarriers, the BRS (ID signal) symbols are obtained in a time-domain representation. The BRS can be identified by matched filtering with respect to a set of BRS hypotheses.

For MRS quality measurements, the entire symbol (both fields) may be used for signal quality estimation.

Design MRS may be a two-part signal format containing a synchronization part and a beam identification and identification part. Multiplexing the TSS and BRS parts into a single OFDM symbol may be supported Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, “each” refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description may include:

AP Access Point
BS Base Station
BRS Beam Reference Signal
BSC Base Station Controller
BTS Base Transceiver Station
CPE Customer Premises Equipment
CRS Cell Specific Reference Signal
CQI Channel Quality Indicator
CSI Channel State Information
CSI-RS Channel State Information Reference Signal
D2D Device-to-device
DL Downlink
DMRS Demodulation Reference Signal
eNB evolved Node B
EPDCCH Enhanced Physical Downlink Control Channel
FFT Fast Fourier Transform
IDFT Inverse Discrete Fourier Transform
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MCS Modulation level and coding scheme
MSR Multi-standard Radio
NR New Radio
OFDM Orthogonal Frequency Division Multiplexing
PDCCH Physical Downlink Control Channel
PDSCH Physical Downlink Shared Channel
PSTN Public Switched Telephone Network
RB Resource Block
RNC Radio Network Controller
RRC Radio Resource Control
RRH Remote Radio Head
RRU Remote Radio Unit
TRP Transmission Reception Point
TSS TRP Synchronisation Signal TTT Time To Trigger
UE User Equipment
UL Uplink
WAN Wide Area Network

The invention claimed is:

1. A method performed by a UE for receiving a cell identifier and associating the cell identifier with a beam identifier, the method comprising:

receiving a physical channel as a beam comprising a cell identifier in a field of the physical channel and a beam identifier for identifying the beam, the beam transmission being unambiguously identified by a demodulation reference signal, wherein the demodulation reference signal comprises a sequence derived from the beam identifier;

associating the cell identifier with the beam identifier based on the received demodulation reference signal.

2. The method of claim 1, wherein the cell identifier is received in a separate field of the beam transmission.

3. The method of claim 1, wherein the cell identifier is a sequence of encoded and quadrature amplitude modulated symbols occupying resource elements in the time domain.

4. The method of claim 1, wherein the cell identifier is transmitted separately from the beam identifier.

5. The method of claim 1, further comprising using the beam identifier and the cell identifier to estimate signal quality of a beam associated with the beam identifier and/or using the received cell identifier to group received mobility reference signals according to their originating cells.

6. A UE for receiving a cell identifier and associating the cell identifier with a beam identifier comprising:

a memory; and a processor communicatively coupled to the memory, the processor configured to:

receive a physical channel as a beam comprising a cell identifier in a field of the physical channel and a beam identifier for identifying the beam, the beam transmission being unambiguously identified by a demodulation reference signal, wherein the demodulation reference signal comprises a sequence derived from the beam identifier; and associate the cell identifier with the beam identifier based on the received demodulation reference signal.

7. The UE of claim 6, wherein the cell identifier is received in a separate field of the beam transmission.

8. The UE of claim 6, wherein the cell identifier is a sequence of encoded and quadrature amplitude modulated symbols occupying resource elements in the time domain.

9. The UE of claim 6, wherein the cell identifier is transmitted separately from the beam identifier.

10. The UE of claim 6, wherein the processor is further configured to use the beam identifier and the cell identifier to estimate signal quality of a beam associated with the beam identifier and/or use the received cell identifier to group received mobility reference signals according to their originating cells.

11. A system for associating a cell identifier with a beam 73. identifier comprising:

a UE comprising:

a UE memory; and a UE processor communicatively coupled to the UE memory, the UE processor configured to:

receive a physical channel as a beam comprising a cell identifier in a field of the physical channel and a beam identifier for identifying the beam, the beam transmission being unambiguously identified by a demodulation reference signal, wherein the demodulation reference signal comprises a sequence derived from the beam identifier; and associate the cell identifier with the beam identifier based on the received demodulation reference signal; and a network node comprising:

a network node memory; and a network node processor communicatively coupled to the network node memory, the network node processor configured to:

determine a cell identifier of the network node;

determine a beam identifier of a beam of the network node; and transmit a physical channel as a beam comprising the cell identifier in a field of the physical channel and the beam identifier, the beam transmission being unambiguously identified by a demodulation reference signal, the demodulation reference signal comprising a sequence derived from the beam identifier.

* * * * *